(12) United States Patent
HomChaudhuri et al.

(10) Patent No.: US 10,075,964 B2
(45) Date of Patent: Sep. 11, 2018

(54) RADIO FREQUENCY SPECTRUM BAND HARMONIZATION

(71) Applicant: QUALCOMM Incorporated, San Diego, CA (US)

(72) Inventors: Sandip HomChaudhuri, San Jose, CA (US); Gangadhar Burra, Fremont, CA (US); Eric Y. Tsou, Palo Alto, CA (US); Chintan Shirish Shah, Chula Vista, CA (US); Francis Ming-Meng Ngai, Louisville, CO (US); Alexei Yurievitch Gorokhov, San Diego, CA (US); Pattabiraman Subramanian, Fremont, CA (US); Ning Zhang, Saratoga, CA (US); James Simon Cho, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 15/249,344

(22) Filed: Aug. 26, 2016

(65) Prior Publication Data

US 2017/0265205 A1    Sep. 14, 2017

Related U.S. Application Data

(60) Provisional application No. 62/306,630, filed on Mar. 10, 2016.

(51) Int. Cl.
| | |
|---|---|
| *H04W 72/08* | (2009.01) |
| *H04B 7/0413* | (2017.01) |
| *H04W 24/08* | (2009.01) |
| *H04W 28/02* | (2009.01) |
| *H04W 72/04* | (2009.01) |
| *H04B 7/06* | (2006.01) |
| *H04W 16/14* | (2009.01) |

(52) U.S. Cl.
CPC ........ *H04W 72/085* (2013.01); *H04B 7/0413* (2013.01); *H04B 7/063* (2013.01);
(Continued)

(58) Field of Classification Search
CPC .... H04B 7/0413; H04B 7/063; H04B 7/0691; H04W 24/08; H04W 28/0289;
(Continued)

(56) References Cited

U.S. PATENT DOCUMENTS

| | | | |
|---|---|---|---|
| 2011/0009105 A1* | 1/2011 | Lee | H01Q 9/0407 455/418 |
| 2012/0282942 A1 | 11/2012 | Uusitalo et al. | |
| 2013/0208662 A1 | 8/2013 | Lee et al. | |
| 2013/0237158 A1* | 9/2013 | Moe | H04W 24/02 455/67.11 |
| 2014/0194116 A1* | 7/2014 | Jalloul | H04B 7/0805 455/434 |
| 2014/0376392 A1 | 12/2014 | Hegde et al. | |

(Continued)

FOREIGN PATENT DOCUMENTS

| | | |
|---|---|---|
| WO | WO-2007051184 A2 | 5/2007 |
| WO | WO-2012134334 A1 | 10/2012 |
| WO | WO-2013048511 A1 | 4/2013 |

OTHER PUBLICATIONS

ISA/EP, International Search Report and Written Opinion of the International Searching Authority, Int'l Application No. PCT/US2017/018385, dated Sep. 5, 2017, European Patent Office, Rijswijk, NL, 22 pgs.

(Continued)

*Primary Examiner* — Benjamin H Elliott, IV
(74) *Attorney, Agent, or Firm* — Holland & Hart LLP/Qualcomm

(57) ABSTRACT

Methods, systems, and devices for wireless communication are described. A user equipment (UE) may be communicat-
(Continued)

ing on a radio frequency spectrum band of a first radio access technology (RAT) using a set of antennas. The UE may reconfigure at least one antenna of the set of antennas to perform a first scan on the radio frequency spectrum band of a second RAT. The UE may determine, based on the first scan, whether to reconfigure a remaining portion of the antennas of the set of antennas to perform a second scan on the radio frequency spectrum band of the second RAT.

29 Claims, 15 Drawing Sheets

(52) U.S. Cl.
CPC .......... *H04B 7/0691* (2013.01); *H04W 16/14* (2013.01); *H04W 24/08* (2013.01); *H04W 28/0289* (2013.01); *H04W 72/042* (2013.01); *H04W 72/0446* (2013.01)

(58) Field of Classification Search
CPC ........... H04W 72/042; H04W 72/0446; H04W 16/14; H04W 72/085
See application file for complete search history.

(56) References Cited

U.S. PATENT DOCUMENTS

| | | |
|---|---|---|
| 2015/0092573 A1 | 4/2015 | Zhang et al. |
| 2015/0119052 A1 | 4/2015 | Caimi et al. |
| 2015/0131622 A1 | 5/2015 | Sahu et al. |
| 2015/0146656 A1 | 5/2015 | Sun et al. |
| 2015/0257042 A1 | 9/2015 | Su et al. |
| 2016/0073417 A1* | 3/2016 | Sebeni ................ H04W 48/16 370/329 |
| 2016/0119039 A1 | 4/2016 | Soliman et al. |
| 2016/0119942 A1 | 4/2016 | Wang |
| 2017/0265205 A1* | 9/2017 | HomChaudhuri ... H04B 7/0413 |

OTHER PUBLICATIONS

ISA/EPO, Partial International Search Report of the International Searching Authority, Int'l. App. No. PCT/US2017/018385, dated May 23, 2017, European Patent Office, Rijswijk, NL, 14 pgs.

* cited by examiner

RADIO FREQUENCY SPECTRUM BAND HARMONIZATION

CROSS REFERENCES

The present Application for Patent claims priority to U.S. Provisional Patent Application No. 62/306,630 by Hom-Chaudhuri, et al., entitled "RADIO FREQUENCY SPECTRUM BAND HARMONIZATION," filed Mar. 10, 2016, assigned to the assignee hereof.

BACKGROUND

The following relates generally to wireless communication, and more specifically to radio frequency spectrum band harmonization.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE). A wireless network may also include components of a wireless local area network (WLAN), such as a Wi-Fi (i.e., IEEE 802.11) network, and may include access points (APs) that may communicate with at least one UE or station (STA).

Wireless communication systems may be heterogeneous systems supporting communications using different radio access technologies (RATs). The different RATs may conventionally communicate using at least one radio frequency spectrum band. When using the same radio frequency spectrum band (e.g., the same frequencies, tones, etc.), suitable co-existence schemes may be helpful in reducing interference. Conventional co-existence techniques may support selecting one RAT for communications on the radio frequency spectrum band at the expense of the other RAT. For example, when a wireless local area network (WLAN) RAT is communicating on the radio frequency spectrum band, a wireless wide area network (WWAN) RAT may not be able to communicate, or may communicate with an excessive amount of interference caused by the WLAN communications.

SUMMARY

The described techniques relate to improved methods, systems, or devices that support smart co-existence techniques for radio frequency spectrum band harmonization. Generally, the described techniques provide for a UE to implement various schemes to support communications on a radio frequency spectrum band of different RATs. For example, the UE may support dynamic antenna, or resource, management techniques to support WAN RAT micro tuneaway procedure, staggering WLAN RAT scans, adaptive link/chain reconfiguration, etc., to support operations on the radio frequency spectrum band. In some examples, the described co-existence techniques are operable by a UE to support WLAN RAT and WWAN RAT communications in an unlicensed radio frequency spectrum band, e.g., a 5 GHz radio frequency spectrum band. In some aspects of the described techniques, the UE may support dynamic scan chain mode, smart scheduling techniques, adaptive link reconfiguration in concurrent active states, a micro tuneaway procedure, first RAT assisted measurement of a second RAT, etc.

A method of wireless communication is described. The method may include communicating on a radio frequency spectrum band of a first radio access technology (RAT) using a set of antennas, reconfiguring at least one antenna of the set of antennas to perform a first scan on the radio frequency spectrum band of a second RAT and determining, based at least in part on the first scan, whether to reconfigure a remaining portion of antennas of the set of antennas to perform a second scan on the radio frequency spectrum band of the second RAT.

An apparatus for wireless communication is described. The apparatus may include means for communicating on a radio frequency spectrum band of a first radio access technology (RAT) using a set of antennas, means for reconfiguring at least one antenna of the set of antennas to perform a first scan on the radio frequency spectrum band of a second RAT and means for determining, based at least in part on the first scan, whether to reconfigure a remaining portion of antennas of the set of antennas to perform a second scan on the radio frequency spectrum band of the second RAT.

A further apparatus is described. The apparatus may include a processor, memory in electronic communication with the processor, and instructions stored in the memory. The instructions may be operable to cause the processor to communicate on a radio frequency spectrum band of a first radio access technology (RAT) using a set of antennas, reconfigure at least one antenna of the set of antennas to perform a first scan on the radio frequency spectrum band of a second RAT and determine, based at least in part on the first scan, whether to reconfigure a remaining portion of antennas of the set of antennas to perform a second scan on the radio frequency spectrum band of the second RAT.

A non-transitory computer readable medium for wireless communication is described. The non-transitory computer-readable medium may include instructions to cause a processor to communicate on a radio frequency spectrum band of a first radio access technology (RAT) using a set of antennas, reconfigure at least one antenna of the set of antennas to perform a first scan on the radio frequency spectrum band of a second RAT and determine, based on the first scan, whether to reconfigure a remaining portion of antennas of the set of antennas to perform a second scan on the radio frequency spectrum band of the second RAT.

Some examples of the method, apparatus, or non-transitory computer-readable medium described above may further include processes, features, means, or instructions for determining, based on the first scan, that an access point count value is less than a channel condition metric. Some examples of the method, apparatus, or non-transitory computer-readable medium described above may further include processes, features, means, or instructions for refraining from reconfiguring the remaining portion of antennas of the set of antennas to perform the second scan.

Some examples of the method, apparatus, or non-transitory computer-readable medium described above may further include processes, features, means, or instructions for determining, based on the first scan, that an access point count is greater than a threshold level. Some examples of the method, apparatus, or non-transitory computer-readable medium described above may further include processes, features, means, or instructions for refraining from reconfiguring the remaining portion of antennas of the set of antennas to perform the second scan.

Some examples of the method, apparatus, or non-transitory computer-readable medium described above may further include processes, features, means, or instructions for determining, based on the first scan, that at least one access point of a set of access points is detected during the first scan. Some examples of the method, apparatus, or non-transitory computer-readable medium described above may further include processes, features, means, or instructions for refraining from reconfiguring the remaining portion of antennas of the set of antennas to perform the second scan.

Some examples of the method, apparatus, or non-transitory computer-readable medium described above may further include processes, features, means, or instructions for determining that a channel scan distribution value for a set of radio frequency spectrum bands is within a predefined deviation value. Some examples of the method, apparatus, or non-transitory computer-readable medium described above may further include processes, features, means, or instructions for reconfiguring, based on the channel scan distribution value, the at least one antenna of the set of antennas to perform the first scan on the radio frequency spectrum band of the second RAT.

Some examples of the method, apparatus, or non-transitory computer-readable medium described above may further include processes, features, means, or instructions for determining that the first scan is associated with a priority scan. Some examples of the method, apparatus, or non-transitory computer-readable medium described above may further include processes, features, means, or instructions for reconfiguring the remaining portion of antennas of the set of antennas to perform the priority scan.

Some examples of the method, apparatus, or non-transitory computer-readable medium described above may further include processes, features, means, or instructions for determining that a congestion metric associated with a different radio frequency spectrum band is above a threshold level. Some examples of the method, apparatus, or non-transitory computer-readable medium described above may further include processes, features, means, or instructions for refraining from reconfiguring the at least one antenna of the set of antennas to perform the first scan.

Some examples of the method, apparatus, or non-transitory computer-readable medium described above may further include processes, features, means, or instructions for identifying a priority metric for the communications during a time period on the radio frequency spectrum band of the first RAT. Some examples of the method, apparatus, or non-transitory computer-readable medium described above may further include processes, features, means, or instructions for reconfiguring the at least one antenna, the remaining portion of antennas, or combinations thereof, of the set of antennas to perform the first and second scans during the time period.

A method of wireless communication is described. The method may include identifying a priority metric for communications during a time period on a radio frequency spectrum band of a first radio access technology (RAT), reconfiguring, based at least in part on the priority metric, at least one antenna of a set of antennas to perform a scan on the radio frequency spectrum band of a second RAT and performing the scan during the time period on the radio frequency spectrum band of the second RAT.

An apparatus for wireless communication is described. The apparatus may include means for identifying a priority metric for communications during a time period on a radio frequency spectrum band of a first radio access technology (RAT), means for reconfiguring, based at least in part on the priority metric, at least one antenna of a set of antennas to perform a scan on the radio frequency spectrum band of a second RAT and means for performing the scan during the time period on the radio frequency spectrum band of the second RAT.

A further apparatus is described. The apparatus may include a processor, memory in electronic communication with the processor, and instructions stored in the memory. The instructions may be operable to cause the processor to identify a priority metric for communications during a time period on a radio frequency spectrum band of a first radio access technology (RAT), reconfigure, based at least in part on the priority metric, at least one antenna of a set of antennas to perform a scan on the radio frequency spectrum band of a second RAT and perform the scan during the time period on the radio frequency spectrum band of the second RAT.

A non-transitory computer readable medium for wireless communication is described. The non-transitory computer-readable medium may include instructions to cause a processor to identify a priority metric for communications during a time period on a radio frequency spectrum band of a first radio access technology (RAT), reconfigure, based on the priority metric, at least one antenna of a set of antennas to perform a scan on the radio frequency spectrum band of a second RAT and perform the scan during the time period on the radio frequency spectrum band of the second RAT.

In some examples of the method, apparatus, or non-transitory computer-readable medium described above, performing the scan on the radio frequency spectrum band of the second RAT comprises interfering with the communications during the time period on the first RAT. In some examples of the method, apparatus, or non-transitory computer-readable medium described above, the scan comprises a dual antenna tune-away procedure.

In some examples of the method, apparatus, or non-transitory computer-readable medium described above, the priority metric indicates that the communications during the time period comprise at least one blank subframe, comprising performing the scan during the at least one blank subframe on the radio frequency spectrum band of the second RAT to avoid interfering with the communications during the time period of the communications on the radio frequency spectrum band of the first RAT.

A method of wireless communication is described. The method may include communicating on a radio frequency spectrum band of a first radio access technology (RAT) using a set of antennas, the set of antennas based at least in part on a rank mode associated with the communications, determining, for at least one antenna of the set of antennas, that a demand requirement associated with the communications is below a threshold level and reconfiguring, based at least in part on the demand requirement, the at least one antenna of the set of antennas to perform communications on the radio frequency spectrum band of a second RAT.

An apparatus for wireless communication is described. The apparatus may include means for communicating on a radio frequency spectrum band of a first radio access technology (RAT) using a set of antennas, the set of antennas based at least in part on a rank mode associated with the communications, means for determining, for at least one antenna of the set of antennas, that a demand requirement associated with the communications is below a threshold level and means for reconfiguring, based at least in part on the demand requirement, the at least one antenna of the set of antennas to perform communications on the radio frequency spectrum band of a second RAT.

A further apparatus is described. The apparatus may include a processor, memory in electronic communication with the processor, and instructions stored in the memory. The instructions may be operable to cause the processor to communicate on a radio frequency spectrum band of a first radio access technology (RAT) using a set of antennas, the set of antennas based at least in part on a rank mode associated with the communications, determine, for at least one antenna of the set of antennas, that a demand requirement associated with the communications is below a threshold level and reconfigure, based at least in part on the demand requirement, the at least one antenna of the set of antennas to perform communications on the radio frequency spectrum band of a second RAT.

A non-transitory computer readable medium for wireless communication is described. The non-transitory computer-readable medium may include instructions to cause a processor to communicate on a radio frequency spectrum band of a first radio access technology (RAT) using a set of antennas, the set of antennas based on a rank mode associated with the communications, determine, for at least one antenna of the set of antennas, that a demand requirement associated with the communications is below a threshold level and reconfigure, based on the demand requirement, the at least one antenna of the set of antennas to perform communications on the radio frequency spectrum band of a second RAT.

In some examples of the method, apparatus, or non-transitory computer-readable medium described above, the demand requirement indicates that the communications are associated with a throughput requirement below a threshold level. In some examples of the method, apparatus, or non-transitory computer-readable medium described above, the demand requirement indicates that the communications are associated with a channel condition parameter above a threshold value.

In some examples of the method, apparatus, or non-transitory computer-readable medium described above, the demand requirement indicates that the communications are associated with a predefined modulation and coding scheme. Some examples of the method, apparatus, or non-transitory computer-readable medium described above may further include processes, features, means, or instructions for transmitting a message to an access point comprising an indication that the at least one antenna of the set of antennas has been reconfigured.

In some examples of the method, apparatus, or non-transitory computer-readable medium described above, the message comprises a multiple-input/multiple-output (MIMO) power save (PS) action frame.

Some examples of the method, apparatus, or non-transitory computer-readable medium described above may further include processes, features, means, or instructions for identifying a priority metric for communications during a time period on the radio frequency spectrum band of the first RAT. Some examples of the method, apparatus, or non-transitory computer-readable medium described above may further include processes, features, means, or instructions for reconfiguring the at least one antenna of the set of antennas to perform communications on the radio frequency spectrum band of the second RAT.

A method of wireless communication is described. The method may include identifying a time period associated with a rank mode modification schedule used for communications on a radio frequency spectrum band of a first radio access technology (RAT), identifying a burst communication requirement on the radio frequency spectrum band of a second RAT, the burst communication requirement comprising a duration that is shorter than the time period associated with the rank mode modification schedule and reconfiguring, based at least in part on the duration being shorter in time, the at least one antenna of the set of antennas to perform burst communications during the duration on the radio frequency spectrum band of the second RAT.

An apparatus for wireless communication is described. The apparatus may include means for identifying a time period associated with a rank mode modification schedule used for communications on a radio frequency spectrum band of a first radio access technology (RAT), means for identifying a burst communication requirement on the radio frequency spectrum band of a second RAT, the burst communication requirement comprising a duration that is shorter than the time period associated with the rank mode modification schedule and means for reconfiguring, based at least in part on the duration being shorter in time, the at least one antenna of the set of antennas to perform burst communications during the duration on the radio frequency spectrum band of the second RAT.

A further apparatus is described. The apparatus may include a processor, memory in electronic communication with the processor, and instructions stored in the memory. The instructions may be operable to cause the processor to identify a time period associated with a rank mode modification schedule used for communications on a radio frequency spectrum band of a first radio access technology (RAT), identify a burst communication requirement on the radio frequency spectrum band of a second RAT, the burst communication requirement comprising a duration that is shorter than the time period associated with the rank mode modification schedule and reconfigure, based at least in part on the duration being shorter in time, the at least one antenna of the set of antennas to perform burst communications during the duration on the radio frequency spectrum band of the second RAT.

A non-transitory computer readable medium for wireless communication is described. The non-transitory computer-readable medium may include instructions to cause a processor to identify a time period associated with a rank mode modification schedule used for communications on a radio frequency spectrum band of a first radio access technology (RAT), identify a burst communication requirement on the radio frequency spectrum band of a second RAT, the burst communication requirement comprising a duration that is shorter than the time period associated with the rank mode modification schedule and reconfigure, based on the duration being shorter in time, the at least one antenna of the set of antennas to perform burst communications during the duration on the radio frequency spectrum band of the second RAT.

In some examples of the method, apparatus, or non-transitory computer-readable medium described above, the burst communications comprise a channel measurement procedure on the radio frequency spectrum band of the second RAT. Some examples of the method, apparatus, or non-transitory computer-readable medium described above may further include processes, features, means, or instructions for refraining from transmitting a message to a base station indicating that the at least one antenna of the set of antennas has been reconfigured.

A method of wireless communication is described. The method may include configuring at least one antenna of a set of antennas for communications on a radio frequency spectrum band of a first radio access technology (RAT), receiving a scan request associated with performing a scan on the radio frequency spectrum band of a second RAT, performing, based at least in part on the scan request, the scan on the radio frequency spectrum band of the second RAT and providing an output indicative of a scan result associated with the scan.

An apparatus for wireless communication is described. The apparatus may include means for configuring at least one antenna of a set of antennas for communications on a radio frequency spectrum band of a first radio access technology (RAT), means for receiving a scan request associated with performing a scan on the radio frequency spectrum band of a second RAT, means for performing, based at least in part on the scan request, the scan on the radio frequency spectrum band of the second RAT and means for providing an output indicative of a scan result associated with the scan.

A further apparatus is described. The apparatus may include a processor, memory in electronic communication with the processor, and instructions stored in the memory. The instructions may be operable to cause the processor to configure at least one antenna of a set of antennas for communications on a radio frequency spectrum band of a first radio access technology (RAT), receive a scan request associated with performing a scan on the radio frequency spectrum band of a second RAT, perform, based at least in part on the scan request, the scan on the radio frequency spectrum band of the second RAT and provide an output indicative of a scan result associated with the scan.

A non-transitory computer readable medium for wireless communication is described. The non-transitory computer-readable medium may include instructions to cause a processor to configure at least one antenna of a set of antennas for communications on a radio frequency spectrum band of a first radio access technology (RAT), receive a scan request associated with performing a scan on the radio frequency spectrum band of a second RAT, perform, based on the scan request, the scan on the radio frequency spectrum band of the second RAT and provide an output indicative of a scan result associated with the scan.

Some examples of the method, apparatus, or non-transitory computer-readable medium described above may further include processes, features, means, or instructions for decoding at least a portion of a message received during the scan. Some examples of the method, apparatus, or non-transitory computer-readable medium described above may further include processes, features, means, or instructions for determining, based on the decoded portion of the message, whether to include information associated with the message in the scan result.

Some examples of the method, apparatus, or non-transitory computer-readable medium described above may further include processes, features, means, or instructions for identifying a reduced communication requirement for a time period associated with the communications on the radio frequency spectrum band of the first RAT. Some examples of the method, apparatus, or non-transitory computer-readable medium described above may further include processes, features, means, or instructions for scheduling the scan to be performed during the time period.

In some examples of the method, apparatus, or non-transitory computer-readable medium described above, the time period comprises at least a portion of a transmit time interval.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Advanced wireless communication systems include using different radio access technologies (RATs)(e.g., long term evolution unlicensed (LTE-U), licensed assisted access (LAA), Wireless Fidelity (Wi-Fi), etc.) that support communications in the same radio frequency spectrum band. One example of the radio frequency spectrum band may include the 5 GHz radio frequency spectrum band. Each RAT, however, may use different configurations for communications, e.g., different timing protocols, different medium access procedures, etc. Conventional co-existence techniques, however, may not provide the flexibility to support smart coordination techniques for radio frequency spectrum band harmonization. For example, conventional techniques may not support a user equipment (UE) that manages aspects of co-existence.

Aspects of the present disclosure are initially described in the context of a wireless communication system. In some examples, a UE (or at least one subsystem, layers, or stacks of the UE) may use the described techniques to provide improved wide area network (WAN) RAT performance, e.g., LAA operations, while still supporting various WLAN RAT features. Broadly, the described techniques effectively uses the medium (e.g., the radio frequency spectrum band) between different RATs. In some aspects of the described techniques, the UE may support dynamic scan chain mode, smart scheduling techniques, adaptive link reconfiguration in concurrent active states, a micro tune-away procedure, first RAT assisted measurement of a second RAT, etc., to support effective medium use.

Figure 1:
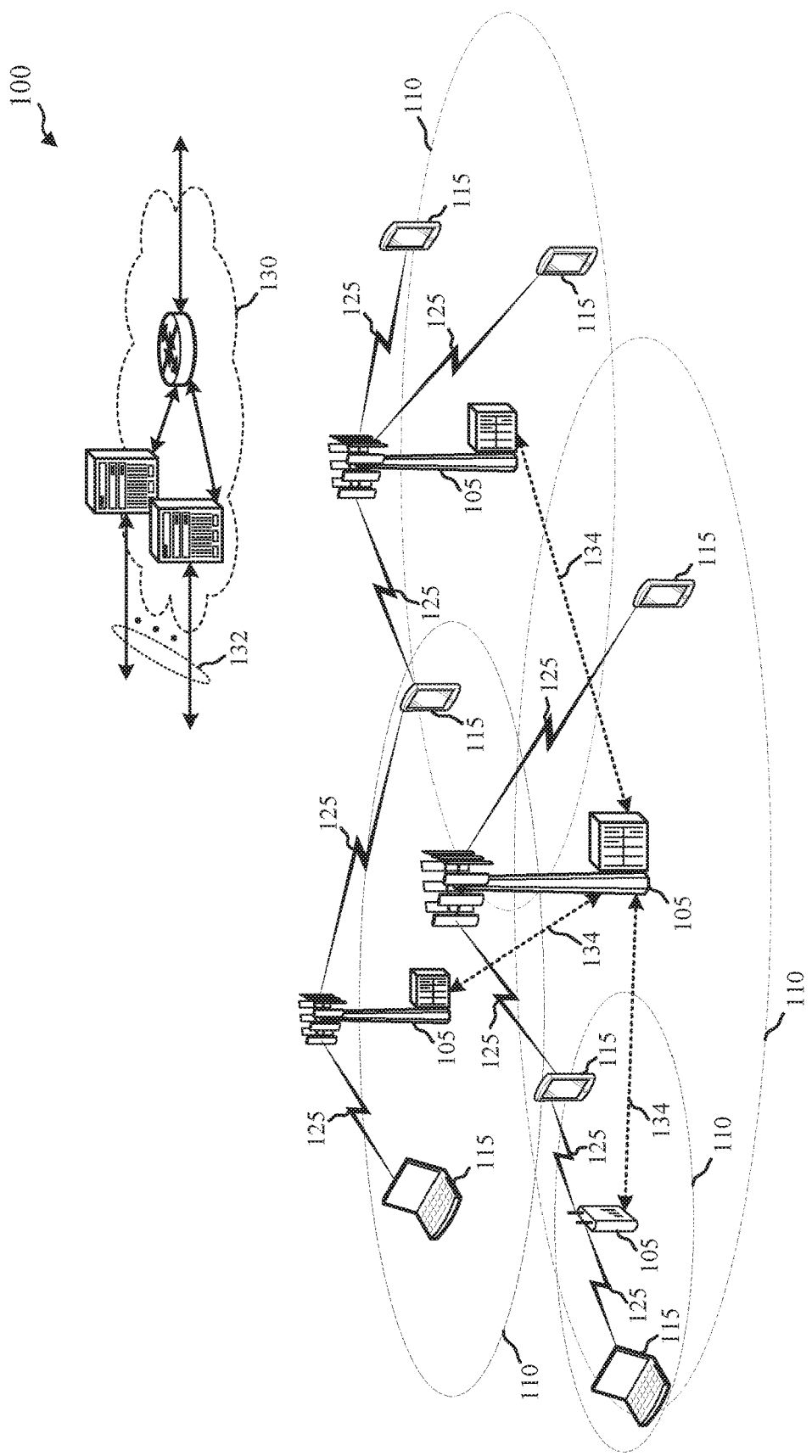
FIG. 1 illustrates an example of a wireless communications system that supports radio frequency spectrum band harmonization in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network.

Base stations 105 may wirelessly communicate with UEs 115 via at least one base station antenna. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

The wireless communications system 100 may also include at least one access point (AP) 106, which may communicate with UEs 115 such as mobile stations, personal digital assistant (PDAs), other handheld devices, netbooks, notebook computers, tablet computers, laptops, display devices (e.g., TVs, computer monitors, etc.), printers, etc. in some cases the AP 106 may be a component of a WLAN, which may be a trusted WLAN associated with the wireless WAN (WWAN) of wireless communications system 100. The AP 106 and the associated UEs 115 may represent a basic service set (BSS) or an extended service set (ESS). The various UEs 115 in the network are able to communicate with one another through the AP 106. Also shown is a coverage area 110 of the AP 106, which may represent a basic service area (BSA) of the wireless communications system 100. An extended network station (not shown) associated with the wireless communications system 100 may be connected to a wired or wireless distribution system that may allow multiple APs 106 to be connected in an ESS.

Although not shown in FIG. 1, a UE 115 may be located in the intersection of more than one coverage area 110 and may associate with more than one base station 105 or AP 106. A single AP 106 and an associated set of UEs 115 may be referred to as a BSS. An ESS can be a set of connected BSSs. A distribution system (not shown) may be used to connect APs 106 in an ESS. In some cases, the coverage area 110 of an AP 106 may be divided into sectors (also not shown). The wireless communications system 100 may include APs 106 of different types (e.g., metropolitan area, home network, etc.), with varying and overlapping coverage areas 110. Two UEs 115 may also communicate directly via a direct wireless link 125 regardless of whether both UEs 115 are in the same coverage area 110. Examples of direct wireless links 120 may include Wi-Fi Direct connections, Wi-Fi Tunneled Direct Link Setup (TDLS) links, and other group connections. UEs 115 and APs 106 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, etc. In other implementations, peer-to-peer connections or ad hoc networks may be implemented within wireless communications system 100.

In some cases, a UE 115, AP 106, or base station 105 may operate in a shared or unlicensed frequency spectrum. These devices may perform a clear channel assessment (CCA) prior to communicating to determine whether the channel is available. A CCA may include an energy detection procedure to determine whether there are any other active transmissions. For example, the device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence.

In some cases, wireless communications system 100 may utilize at least one enhanced component carrier (eCC). An eCC may be characterized by at least one feature, including: flexible bandwidth, different transmission time intervals (TTIs), and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum).

An eCC characterized by flexible bandwidth may include at least one segment that may be utilized by UEs 115 that are not capable of monitoring the whole bandwidth or prefer to use a limited bandwidth (e.g., to conserve power). In some cases, an eCC may utilize a different TTI length than other component carriers (CCs), which may include use of a reduced or variable symbol duration as compared with TTIs of the other CCs. The symbol duration may remain the same, in some cases, but each symbol may represent a distinct TTI. In some examples, an eCC may support transmissions using different TTI lengths. For example, some CCs may use uniform 1 ms TTIs, whereas an eCC may use a TTI length of a single symbol, a pair of symbols, or a slot. In some cases, a shorter symbol duration may also be associated with increased subcarrier spacing. In conjunction with the reduced TTI length, an eCC may utilize dynamic time division duplex (TDD) operation (i.e., it may switch from DL to UL operation for short bursts according to dynamic conditions.)

Flexible bandwidth and variable TTIs may be associated with a modified control channel configuration (e.g., an eCC may utilize an enhanced physical downlink control channel (ePDCCH) for DL control information). For example, at least one control channel of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional hybrid automatic repeat request (HARQ) related control information.

A UE 115 may collaboratively communicate with multiple evolved node B (eNB)s 105 through, for example, Multiple Input Multiple Output (MIMO), Coordinated Multi-Point (CoMP), or other schemes. Multiple input multiple output (MIMO) techniques use multiple antennas on the base stations or multiple antennas on the UE to take advantage of multipath environments to transmit multiple data streams. CoMP includes techniques for dynamic coordination of transmission and reception by a number of eNBs to improve overall transmission quality for UEs as well as increasing network and spectrum utilization.

In some aspects, the UE 115 may support a dynamic scan chain mode. The UE 115 may be communicating on the radio frequency spectrum band in a first RAT (e.g., a WAN RAT) using multiple antennas. The UE 115 may reconfigure one antenna to a second RAT (e.g., a WLAN RAT) and perform a scan on the radio frequency spectrum band of the second RAT. Example scans may include, but are not limited to, connectivity oriented scans, location oriented scans, hotlist scans, a dual-band simultaneous (DBS) scan, priority scans, and the like. Based on the scan results, the UE 115 may determine whether to reconfigure additional antennas to perform a scan on the radio frequency spectrum band of the second RAT. In some examples where the first scan is successful, the UE may refrain from reconfiguring additional antenna(s).

In some aspects, the UE 115 may employ smart scheduling techniques. The UE 115 may be communicating on the radio frequency spectrum band in a first RAT (e.g., a WAN RAT) using multiple antennas. The UE 115 may determine a priority metric during a time period for the first RAT communications, e.g., during at least one subframe. The priority metric may indicate whether the first RAT communications are a high or low priority, are scheduled for only a portion of the subframes of a frame, etc. Accordingly, the UE 115 may perform a scan (or perform communications) on the radio frequency spectrum band of the second RAT during the time period. In some examples, a scan of the second RAT during the time period may include an active scan where the UE 115 transmits on the radio frequency spectrum band of the second RAT. The transmission may be scheduled to avoid conflicting with communications on the radio frequency spectrum band of the first RAT, e.g., when the first RAT communications are high priority. The transmission may be scheduled to overlap communications on the radio frequency spectrum band of the first RAT, e.g., when the first RAT communications are low priority and are suitable for interference.

In some aspects, the UE 115 may support adaptive link reconfiguration in concurrent active states. For example, the UE 115 may be communicating on the radio frequency spectrum band of the first RAT (e.g., WLAN RAT) using a rank mode. The rank mode may include a full rank mode for the first RAT communications using all of the antennas of the UE. The UE 115 may determine a demand requirement for the first RAT communications, e.g., whether the throughput requirement for each link is exceeded for the first RAT communications, based on the link signal strength/quality, a modulation and coding scheme (MCS) for the first RAT communications, etc. When the first RAT communications do not demand the current rank mode, the UE 115 may reduce its rank mode and reconfigure at least one antenna for communications on the radio frequency spectrum band of the second RAT. Thus, the UE 115 may support concurrent active state communications on the radio frequency spectrum band of the first RAT and the second RAT. In some aspects, the UE 115 may support smart transmission scheduling for one RAT communications to avoid interference with the other RAT communications.

In some aspects, the UE 115 may support a first RAT micro tune-away procedure. For example, the UE 115 may be communicating on the radio frequency spectrum band using a first RAT using a rank mode. The rank mode may have an associated rank mode modification schedule where the UE 115 can signal a change request to the current rank mode. The UE 115 may identify a burst communication requirement on the radio frequency spectrum band of the second RAT. The burst communication requirement may have a duration that is shorter than the periodicity of the rank mode modification schedule. Thus, the UE 115 may reconfigure at least one antenna to support the burst communications on the radio frequency spectrum band of the second RAT. The UE 115 may reconfigure the antenna without informing its serving base station 105 of the reconfiguration. Thus, the UE 115 may support the burst communications on the radio frequency spectrum band of the second RAT without disrupting or reconfiguring the first RAT communications on the radio frequency spectrum band.

In some aspects, the UE 115 may support a first RAT assisted measurements of a second RAT. For example, the UE 115 may be communicating on the radio frequency spectrum band using a first RAT. The UE 115 may receive or identify a scan request associated with performing a scan on the radio frequency spectrum band of the second RAT. The scan request may be received from a subsystem of the UE 115 that manages aspects of the second RAT communications. The UE 115 may perform the scan on the radio frequency spectrum band of the second RAT and provide an output indicative of the scan results. For example, the first RAT subsystem of the UE 115 may provide an output to the second RAT subsystem of the UE 115.

Although an antenna or antennas are described as examples in the present disclosure, the techniques and the methods described herein apply to various other resources associated with at least one device (e.g., a UE 115, an AP 106, or a base station 105, among others). Additional resources may include, but are not limited to, modem hardware (e.g., a processing unit of a modem), baseband hardware, a radio frequency (RF) front end, an RF back end, RF chip components (e.g., a number of oscillators), other resources, or a combination thereof. As such, the described techniques and methods also apply to other resources associated with at least one device, and examples and embodiments based on these other resources are contemplated, in accordance with various aspects described with reference to any or all of the concepts discussed herein or based on any or all of FIGS. 1-15.

Figure 2:
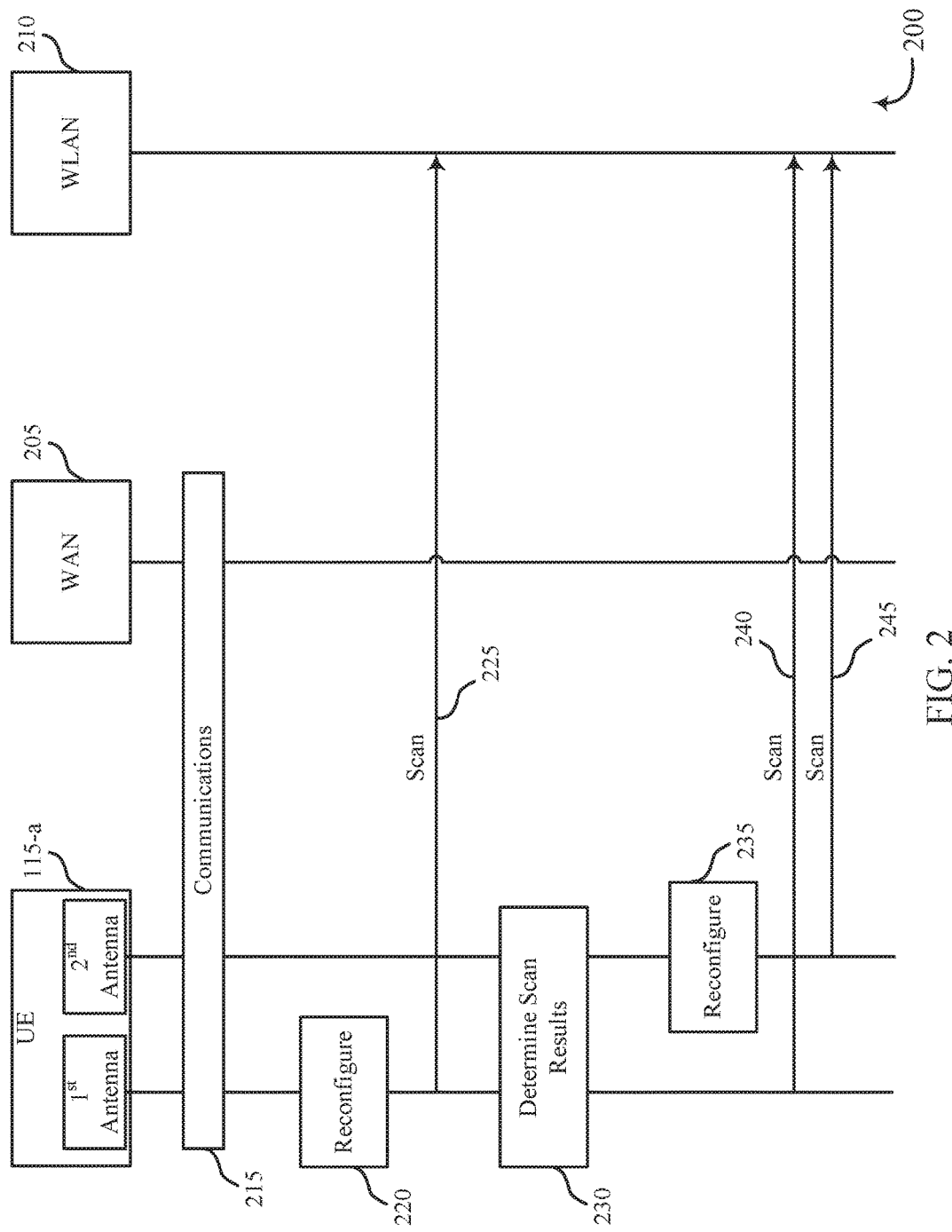
FIG. 2 illustrates an example of a process flow in a wireless communications system that supports radio frequency spectrum band harmonization in accordance with aspects of the present disclosure.

FIG. 2 shows a process flow 200 in a wireless communication system that supports radio frequency spectrum band harmonization, in accordance with various aspects of the present disclosure. Process flow 200 may include a UE 115-a, which may be an example of the corresponding device described with reference to FIG. 1. Process flow 200 may include a WAN 205 and a WLAN 210, which may be an example of a base station 105 and an access point, respectively, as described with reference to FIG. 1. Generally, process flow 200 illustrates an example of UE 115-a employing a dynamic scan chain mode to support co-existence on a radio frequency spectrum band of different RATs. In certain aspects, the process flow 200 illustrates an example of the UE 115-a beginning a WLAN scan using a single antenna tune-away (SATA) procedure and, depending on the scan results, determining whether to scan the radio frequency spectrum band using a dual antenna tune-away (DATA) procedure.

In the example of process flow 200, the UE 115-a is shown and described as having two antennas (e.g., a first antenna and second antenna). It is to be understood that the UE 115-a may include more than two antennas. It is also to be understood that the WAN 205 may illustrate aspects of a wireless communication system that supports communications on a radio frequency spectrum band of a first RAT. In some examples, the WAN 205 may support communications on a LTE-U RAT, a LAA RAT, etc. The WAN 205 may be implemented as a base station, as a cell, etc. It is also to be understood that the WLAN 210 may illustrate aspects of a wireless communication system that supports communications on a radio frequency spectrum band of a second RAT. In some examples, the WLAN 210 may support communications on a Wi-Fi RAT, etc. The WLAN 210 may be implemented as an access point, etc.

At 215, the UE 115-a may be in communication on a radio frequency spectrum band with a first RAT. The first RAT may be a WAN RAT, e.g., a LTE-U, LAA, etc., RAT and the UE 115-a may be in communications with the WAN 205. The UE 115-a may be communicating on the radio frequency spectrum band with the WAN 205 using a set of antennas, e.g., the first and second antennas. In some aspects, the UE 115-a may communicate with WAN 205 on the radio frequency spectrum band of the WAN RAT using a full rank mode where all antennas of the UE 115-a are for WAN RAT communications.

At 220, the UE 115-a may reconfigure the first antenna to perform a scan on the radio frequency spectrum band of a second RAT. The second RAT may be a WLAN RAT, e.g., a Wi-Fi RAT, and the UE 115-a may scan the radio frequency spectrum band of the second RAT by scanning WLAN 210. Reconfiguring the first antenna may include retuning the antenna or transceiver chain associated with the first antenna to a different frequency of the radio frequency spectrum band of the second RAT. Additionally or alternatively, reconfiguring the first antenna may include changing a timing component, a frame alignment component, a transmission mode, etc., for communications on the radio frequency spectrum band of the second RAT.

At 225, the UE 115-a may use the first antenna (e.g., the reconfigured antenna) to perform a scan on the radio frequency spectrum band of the second RAT. For example, the UE 115-a may use the first antenna to scan WLAN 210. It is to be understood that various scans of the radio frequency spectrum band of the second RAT are contemplated with the present disclosure. In some examples, the scan may be a connectivity oriented scan, e.g., a roaming scan, a preferred network operator scan, etc. In another example, the scan may be a location oriented scan, e.g., to locate particular access points, to establish a trail, etc. In another example, the scan may be a hotlist scan, e.g., a scan to attempt to identify certain access points. In another example, the scan may be a DBS scan where a single antenna is selected for the scan. In another example, the scan may be a priority scan, e.g., an urgent scan to trigger a DBS scan. In another example, the scan may be a smart roaming scan, e.g., a scan to identify available 5 GHz access points for communication while the UE 115-a is camped on a 2 GHz access point.

At 230, the UE 115-a may determine the scan results of the first scan. In some aspects, determining the scan results may include identifying various configurable parameters determined based on the first scan. A first configurable parameter may include an access point count value indicative of the number of access points discovered during the first scan. A second configurable parameter may include a channel condition metric indicative of a received signal strength, interference level, etc., of the radio frequency spectrum band of the second RAT. A third configurable parameter may include a channel scan distribution value indicative of how many channel in a particular radio frequency spectrum band are to be scanned. Other configurable parameters may also be considered.

Determining the scan result may provide an indication of whether the UE 115-a will reconfigure the second antenna for a second scan on the radio frequency spectrum band of the second RAT. The determination may be based on the type of scans and the associated configurable parameter.

In an example connectivity oriented scan, the determination may be based on whether the number of discovered access points (e.g., the access point count value) is greater than a receive signal strength indicator (RSSI), channel quality indicator (CQI), etc., (e.g., the channel condition metric). If the access point count value is greater than the channel condition metric, the UE 115-a may determine that the first scan was a success and therefore refrain from configuring the second antenna (e.g., the remaining antennas) to perform a second scan. When the access point count value is below or lower than the channel condition metric, the UE 115-a may consider the first scan as unsuccessful and therefore reconfigure the second antenna to perform a second scan on the radio frequency spectrum band of the second RAT.

In an example location oriented scan, the determination may be based on whether the number of discovered access points (e.g., the access point count value) is greater than a threshold value, e.g., a sufficient number of access points were discovered to support the location functions of the UE 115-a. If the access point count value is greater than the threshold value, the UE 115-a may determine that the first scan was a success and therefore refrain from configuring the second antenna (e.g., the remaining antennas) to perform a second scan. When the access point count value is below or lower than the threshold value, the UE 115-a may consider the first scan as unsuccessful and therefore reconfigure the second antenna to perform a second scan on the radio frequency spectrum band of the second RAT.

In an example hotlist scan, the determination may be based on whether at least one access point from a set of access points has been discovered, e.g., a preferred access point. If at least one of the hotlist access points is found, the UE 115-*a* may determine that the first scan was a success and therefore refrain from configuring the second antenna (e.g., the remaining antennas) to perform a second scan. If none of the hotlist access points are discovered during the first scan, the UE 115-*a* may consider the first scan as unsuccessful and therefore reconfigure the second antenna to perform a second scan on the radio frequency spectrum band of the second RAT.

In an example DBS scan, the determination may be based on whether a channel scan distribution value is with a predefined threshold value. The DBS scan may including scanning multiple channels on different radio frequency spectrum bands. The DBS scan list may include a first set of channels for a first radio frequency spectrum band, a second set of channels for a second radio frequency spectrum band, etc. The deviation value may be associated with the number of channels assigned to different radio frequency spectrum bands. If the channel scan distribution value is within the predefined deviation value (e.g., within 40/60 or 60/40), the UE 115-*a* may configure the first antenna to perform the first scan on the radio frequency spectrum band of the second RAT. If the channel scan distribution value is outside of the predefined deviation value, the UE 115-*a* may reconfigure the second antenna (e.g., the remaining antennas) to perform a second scan.

In an example priority scan, the determination may be based on an indication that the first scan is a priority scan. In this example, the UE 115-*a* may reconfigure the second antenna to perform a scan on the radio frequency spectrum band of the second RAT.

In an example smart roaming scan, the scan may be deferred until a congestion metric associated with a different radio frequency spectrum band goes above a threshold. An example smart roaming scan may include a UE 115-*a* camped on a 2 GHz radio frequency spectrum band where the UE 115-*a* may perform scans on a 5 GHz band to determine if a more favorable connection is available. In some aspects, the scan on the 5 GHz radio frequency spectrum band, e.g., the first scan, may be deferred until the connection on the 2 GHz radio frequency spectrum band deteriorates below a threshold. For example, the congestion metric on the 2 GHz radio frequency spectrum band may become greater than a threshold, the throughput on the 2 GHz may fall below a threshold, etc. Once the 2 GHz connection deteriorates below the threshold, the UE 115-*a* may reconfigure the first antenna to perform the first scan. The UE 115-*a* may reconfigure the second antenna to perform a second scan on the radio frequency spectrum band of the second RAT based on the examples described above. In addition to the congestion metric discussed above, the smart roaming scan may be deferred based on other considerations of the 2 GHz link, e.g., a throughput of communications of the 2 GHz link, based on a channel condition of the 2 GHz link (e.g., an RSSI, SNR, etc.), based on a MCS of the 2 GHz link, etc. For example, a high MCS for the 2 GHz link may provide an indication that the UE 115-*a* may reconfigure the first and/or second antennas to scan the radio frequency spectrum band of the second RAT.

In some examples, the UE 115-*a* may utilize a smart scheduling technique during any of the above-described scan techniques. For example, the UE 115-*a* may identify a priority metric for communications during a time period on the radio frequency spectrum band of the first RAT and reconfigure the first antenna and/or the second antenna to perform scans during the time period. The smart scheduling may include avoiding second RAT transmissions during subframes, for example, where first RAT signals are scheduled to be received. In another example, the smart scheduling may include overlapping second RAT transmissions during subframe, for example, where low priority first RAT signals are scheduled to be received.

At 235, the UE 115-*a* may reconfigure the second antenna to perform a second scan on the radio frequency spectrum band of the second RAT, e.g., the WLAN 210. For example, the UE 115-*a* may reconfigure the second antenna based on the results of the first scan, as is described above. When the scan results of the first scan indicate that a DATA procedure is needed, at 240 and 245, the UE 115-*a* may perform a second scan of the radio frequency spectrum band of the second RAT using the first and second antennas, respectively.

It is to be understood that initially using a single antenna for the first scan, rather than two antennas, may provide different results in different environments. For example, a SATA procedure may not permit the UE 115-*a* to exploit antenna diversity for the radio frequency spectrum band of the second RAT. However, using the single antenna for the first scan may provide suitable results, e.g., a sufficient number of access points are discovered, to mitigate the need to use the second antenna for the second scan on the radio frequency spectrum band of the second RAT. Therefore, the UE 115-*a* may support co-existence techniques for communications on the radio frequency spectrum band of the first and second RAT.

Although an antenna or antennas are described as examples in the present disclosure, the techniques and the methods described herein apply to various other resources associated with at least one device (e.g., a UE 115, an AP 106, or a base station 105, among others). Additional resources may include, but are not limited to, modem hardware (e.g., a processing unit of a modem), baseband hardware, a radio frequency (RF) front end, an RF back end, RF chip components (e.g., a number of oscillators), other resources, or a combination thereof. As such, the described techniques and methods also apply to other resources associated with at least one device, and examples and embodiments based on these other resources are contemplated.

Figure 3:
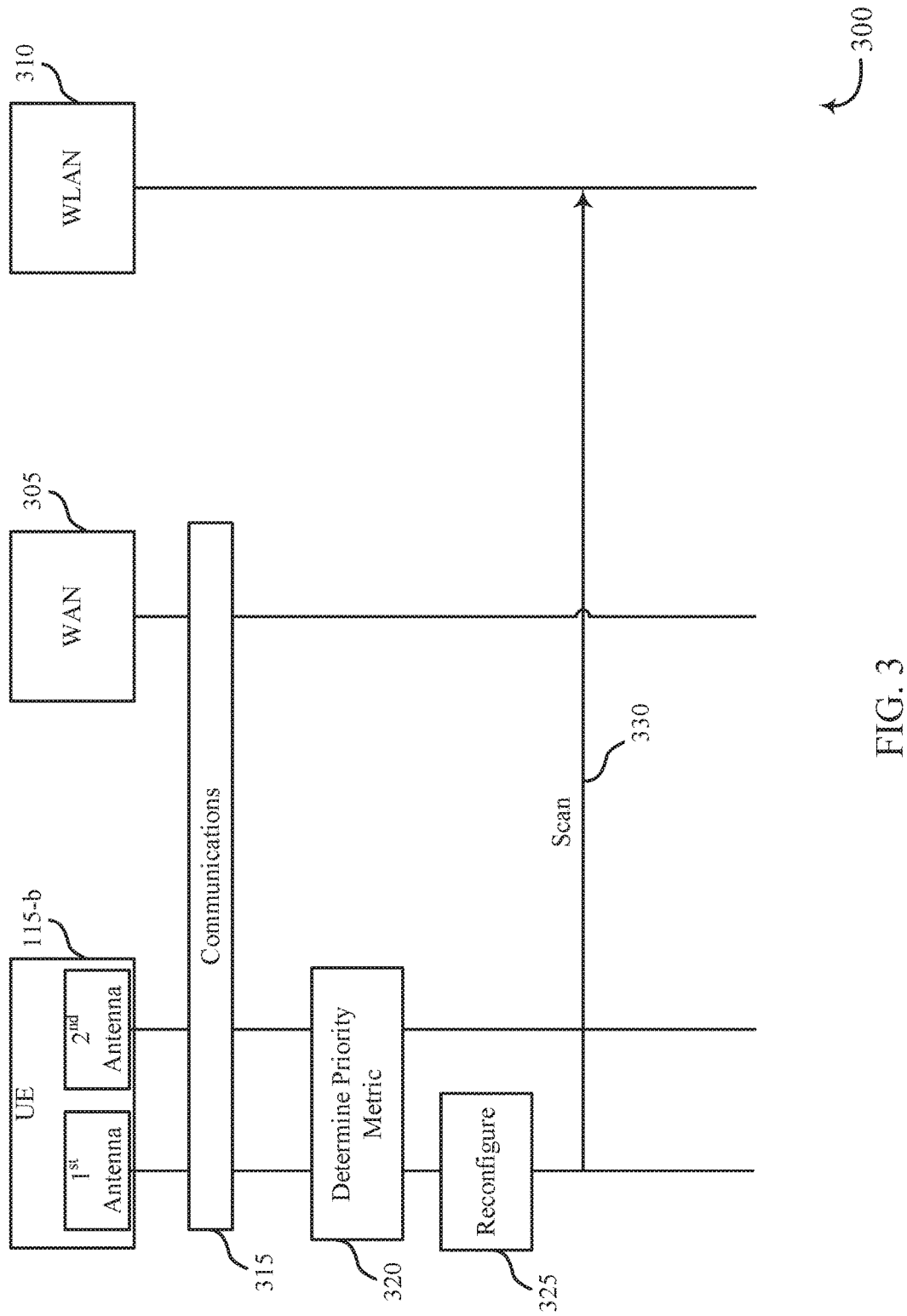
FIG. 3 illustrates an example of a process flow in a wireless communications system that supports radio frequency spectrum band harmonization in accordance with aspects of the present disclosure.

FIG. 3 shows a process flow 300 in a wireless communication system that supports radio frequency spectrum band harmonization, in accordance with various aspects of the present disclosure. Process flow 300 may include a UE 115-*b*, which may be an example of the corresponding device described with reference to FIG. 1 or 2. Process flow 300 may include a WAN 305 and a WLAN 310, which may be an example of a base station 105 and an access point, respectively, as described with reference to FIG. 1. WAN 305 and WLAN 310 may also be examples of the WAN 205 and WLAN 210, respectively, as described with reference to FIG. 2. Generally, process flow 300 illustrates an example of UE 115-*b* employing a smart scheduling techniques to support co-existence on a radio frequency spectrum band of different RATs.

In the example of process flow 300, the UE 115-*b* is shown and described as having two antennas (e.g., a first antenna and second antenna). It is to be understood that the UE 115-*b* may include more than two antennas. It is also to be understood that the WAN 305 may illustrate aspects of a wireless communication system that supports communications on a radio frequency spectrum band of a first RAT. In some examples, the WAN 305 may support communications on a LTE-U RAT, a LAA RAT, etc. The WAN 305 may be implemented as a base station, as a cell, etc. It is also to be understood that the WLAN 310 may illustrate aspects of a wireless communication system that supports communications on a radio frequency spectrum band of a second RAT. In some examples, the WLAN 310 may support communications on a Wi-Fi RAT, etc. The WLAN 310 may be implemented as an access point, etc.

At 315, the UE 115-b may be in communication on a radio frequency spectrum band with a first RAT. The first RAT may be a WAN RAT, e.g., a LTE-U, LAA, etc., RAT and the UE 115-b may be in communications with the WAN 305. The UE 115-b may be communicating on the radio frequency spectrum band with the WAN 305 using a set of antennas, e.g., the first and second antennas. In some aspects, the UE 115-b may be communicating with WAN 305 on the radio frequency spectrum band of the WAN RAT using a full rank mode where all antennas of the UE 115-a are for WAN RAT communications.

At 320, the UE 115-b may determine a priority metric associated with communications during a time period on the radio frequency spectrum band of the first RAT. The priority metric may be associated with a priority level for the communications during the time period on the radio frequency spectrum band of the first RAT, e.g., low priority or high priority communications. The priority metric may be associated with a scheduling priority associated with the communications during the time period on the radio frequency spectrum band of the first RAT. For example, the priority metric may provide an indication of the timing of the first RAT communications. In another example, the priority metric may provide an indication of whether first RAT communications are scheduled during the time period (e.g., blank subframes). In some aspects, the priority metric may be associated with a subframe timing parameter, a frame timing parameter, etc. The priority metric may be associated with a transmit time interval (TTI) for the communications on the radio frequency spectrum band of the first RAT.

The priority metric may provide an indication of whether the UE 115-b may reconfigure the first antenna and/or the second antenna to perform a scan (or other communications) on the radio frequency spectrum band of the second RAT. For example, whether an active scan that includes WLAN transmissions or a passive scan is desired on the radio frequency spectrum band of the second RAT, the priority metric may be used to adjust the timing of the WLAN scan based on the WAN communications.

In some examples of the smart scheduling techniques, overlapping communications may be supported. For example, the priority metric may indicate that the low priority WAN communications are scheduled for a subframe. The priority metric may provide an indication that the UE 115-b may support scheduling a scan on the radio frequency spectrum band of the second RAT that overlaps with (e.g., interferes with) the WAN communications.

In another example, the smart scheduling techniques may be used to avoid overlapping communications. For example, the priority metric may indicate that WAN communications are scheduled for particular subframes. The UE 115-b may schedule the scan of the radio frequency spectrum band of the second RAT during other subframes (e.g., blank subframes) to avoid interfering with the scheduled WAN communications.

In some aspects, the priority metric may be based on subframe guidance. For example, the UE 115-b may decode a first portion of the subframe to determine whether communications on the radio frequency spectrum band of the first RAT are being received. If no communications are for the UE 115-b, the UE 115-b may indicate via the priority metric that a second portion of the subframe (e.g., the remaining portion) is available to perform a scan on the radio frequency spectrum band of the second RAT.

Thus, using the described smart scheduling techniques, at 325 the UE 115-b may reconfigure the first antenna to perform a scan on the radio frequency spectrum band of the second RAT (e.g., the WLAN 310) and perform the scan at 330.

Figure 4:
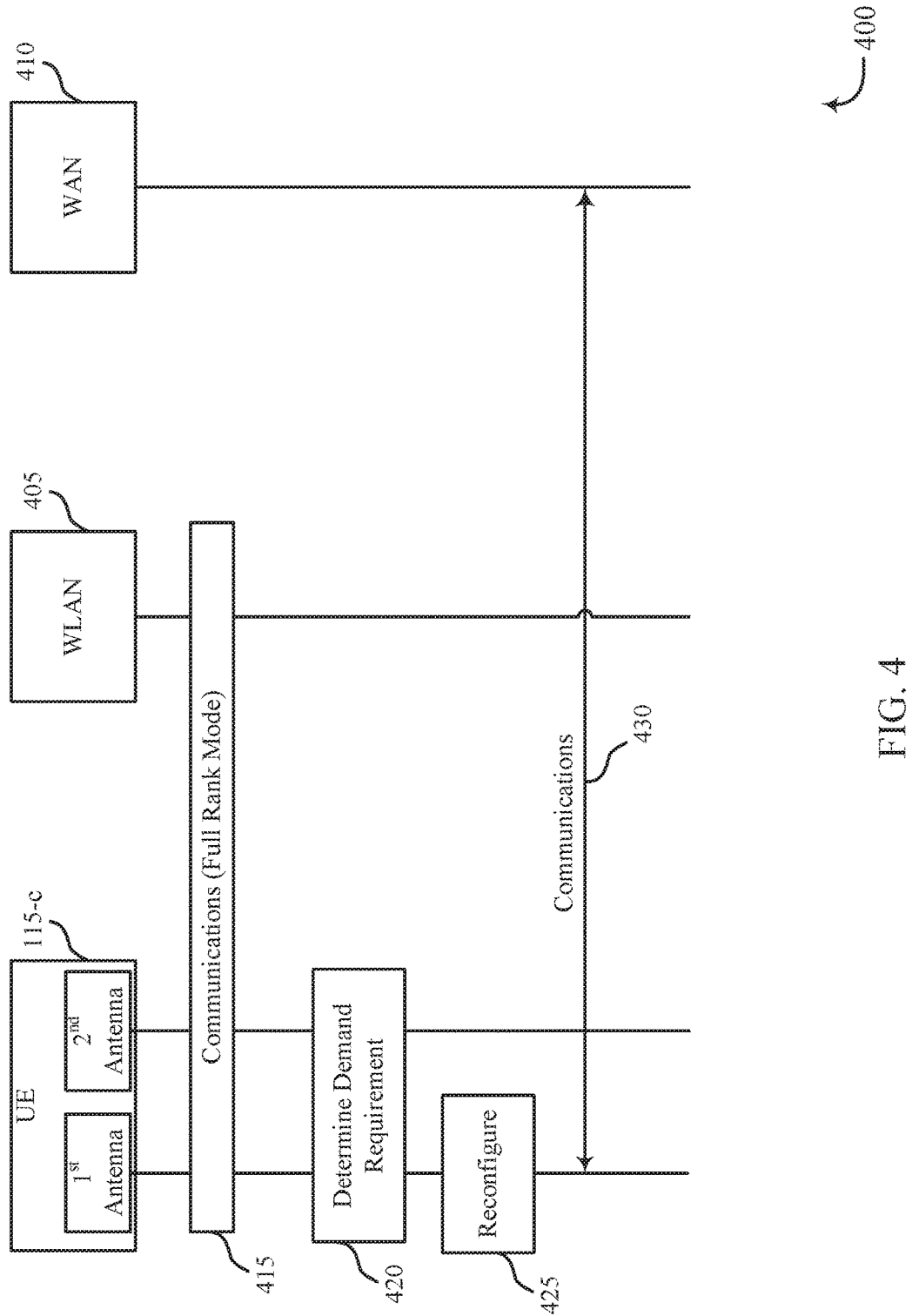
FIG. 4 illustrates an example of a process flow in a wireless communications system that supports radio frequency spectrum band harmonization in accordance with aspects of the present disclosure.

FIG. 4 shows a process flow 400 in a wireless communication system that supports radio frequency spectrum band harmonization, in accordance with various aspects of the present disclosure. Process flow 400 may include a UE 115-c, which may be an example of the corresponding device described with reference to FIGS. 1 through 3. Process flow 400 may include a WLAN 405 and a WAN 410, which may be an example of an access point and base station 105, respectively, as described with reference to FIG. 1. WLAN 405 and WAN 410 may also be examples of the WLAN 210/310 and WAN 205/305, respectively, as described with reference to FIGS. 2 and 3. Generally, process flow 400 illustrates an example of UE 115-c employing an adaptive link reconfiguration in concurrent active state technique to support co-existence on a radio frequency spectrum band of different RATs.

In the example of process flow 400, the UE 115-c is shown and described as having two antennas (e.g., a first antenna and second antenna). It is to be understood that the UE 115-c may include more than two antennas. It is also to be understood that the WLAN 405 may illustrate aspects of a wireless communication system that supports communications on a radio frequency spectrum band of a first RAT. In some examples, the WLAN 405 may support communications on a Wi-Fi RAT, etc. The WLAN 405 may be implemented as an access point, etc. It is also to be understood that the WAN 410 may illustrate aspects of a wireless communication system that supports communications on a radio frequency spectrum band of a second RAT. In some examples, the WAN 410 may support communications on a LTE-U RAT, a LAA RAT, etc. The WAN 410 may be implemented as a base station, as a cell, etc.

Broadly, the process flow 400 illustrates aspects of an adaptive link reconfiguration in concurrent active state technique. For example, the UE 115-c may be connected to a WLAN RAT (e.g., WLAN 405) and communicating in a full rank mode (e.g., 2×2, 4×2, etc.). The full rank mode may indicate that the UE 115-c is using all antennas for communications on the radio frequency spectrum band of the WLAN RAT. In the full rank mode, the throughput requirement for each link (e.g., transmit antenna to receive antenna link) may not require the full rank mode, e.g., the communication demands of the WLAN RAT may not require the communication capability of the full rank mode. Thus, a higher layer link configuration manager may determine a demand requirement of the communications on the WLAN RAT (e.g., voice-over-internet-protocol (VOIP) vs. web browsing) and provide for the WLAN subsystem of the UE 115-c to reduce its rank mode from the full rank to a lower rank e.g., reconfigure at least one antenna. The reconfigured antennas may be utilized for WAN communications on the radio frequency spectrum band of the WAN RAT.

At 415, the UE 115-c may be in communication on a radio frequency spectrum band with a first RAT. The first RAT may be a WLAN RAT, e.g., a Wi-Fi RAT, and the UE 115-c may be in communications with the WLAN 405. The UE 115-c may be communicating on the radio frequency spectrum band with the WLAN 405 using a set of antennas, e.g., the first and second antennas, in a full rank mode. In the full rank mode, the UE 115-c may be using all available antennas for the communications on the radio frequency spectrum band of the first RAT.

At 420, the UE 115-c may determine a demand requirement for the communications on the radio frequency spectrum band of the first RAT. The demand requirement may be above a threshold or below a threshold level. Generally, the demand requirement may provide an indication of the nature or needs of the communications on the radio frequency spectrum band of the first RAT. For example, the demand requirement of the first RAT communications may be based on the channel condition of the WLAN link (e.g., an indication of whether dropping the rank mode and its associated diversity gain is acceptable). An example channel condition may include an RSSI, SNR, etc., for the communications on the radio frequency spectrum band of the first RAT. When the channel conditions deteriorate below a certain point, the demand requirement may be considered below the threshold level and the UE 115-c may reconfigure at least one antenna (e.g., reduce the rank mode).

In another example, the demand requirement of the first RAT communications may be based on the ongoing throughput of the communications on the radio frequency spectrum band of the first RAT. For example, the ongoing throughput may be declining and this may indicate that the full rank mode may be needed to support the first RAT communications. In another example, the ongoing throughput may be consistent and yet below a capability of the full rank mode. This may indicate that the full rank mode may be unnecessary (e.g., the demand requirement is below the threshold) and therefore the UE 115-c can reconfigure at least one antenna.

In another example, the demand requirement of the first RAT communications may be based on a MCS of the communications on the radio frequency spectrum band of the first RAT. For example, a high MCS may indicate that the full rank mode is needed and the UE 115-c may refrain from changing the rank mode (e.g., the demand requirement is above a threshold). In another example, a low MCS may indicate that the full rank mode is unnecessary (e.g., the demand requirement is below a threshold) and the UE 115-c may reconfigure at least one antenna.

Thus, at 425 the UE 115-c may reconfigure the first antenna to support communications on the radio frequency spectrum band of the second RAT. The UE 115-c may reconfigure the first antenna based on the demand requirement being below the threshold level. At 430, the UE 115-c may perform communications on the radio frequency spectrum band of the second RAT.

Generally, the process flow 400 provides for the UE 115-c to support operations in an active mode concurrently (e.g., communicating on the radio frequency spectrum band of the first and second RATs). In some aspects, however, the UE 115-c may employ the smart scheduling techniques to schedule communications on the radio frequency spectrum band of the first and/or second RATs. For example, the UE 115-c may schedule overlapping communications (e.g., when one communication is a low priority) and/or on non-overlapping communications (e.g. during blank subframes). Thus, a WLAN transmission (e.g., an active scan transmission) may be schedule so as to not overlap or interfere with a schedule reception of the WAN signal on the second RAT.

Figure 5:
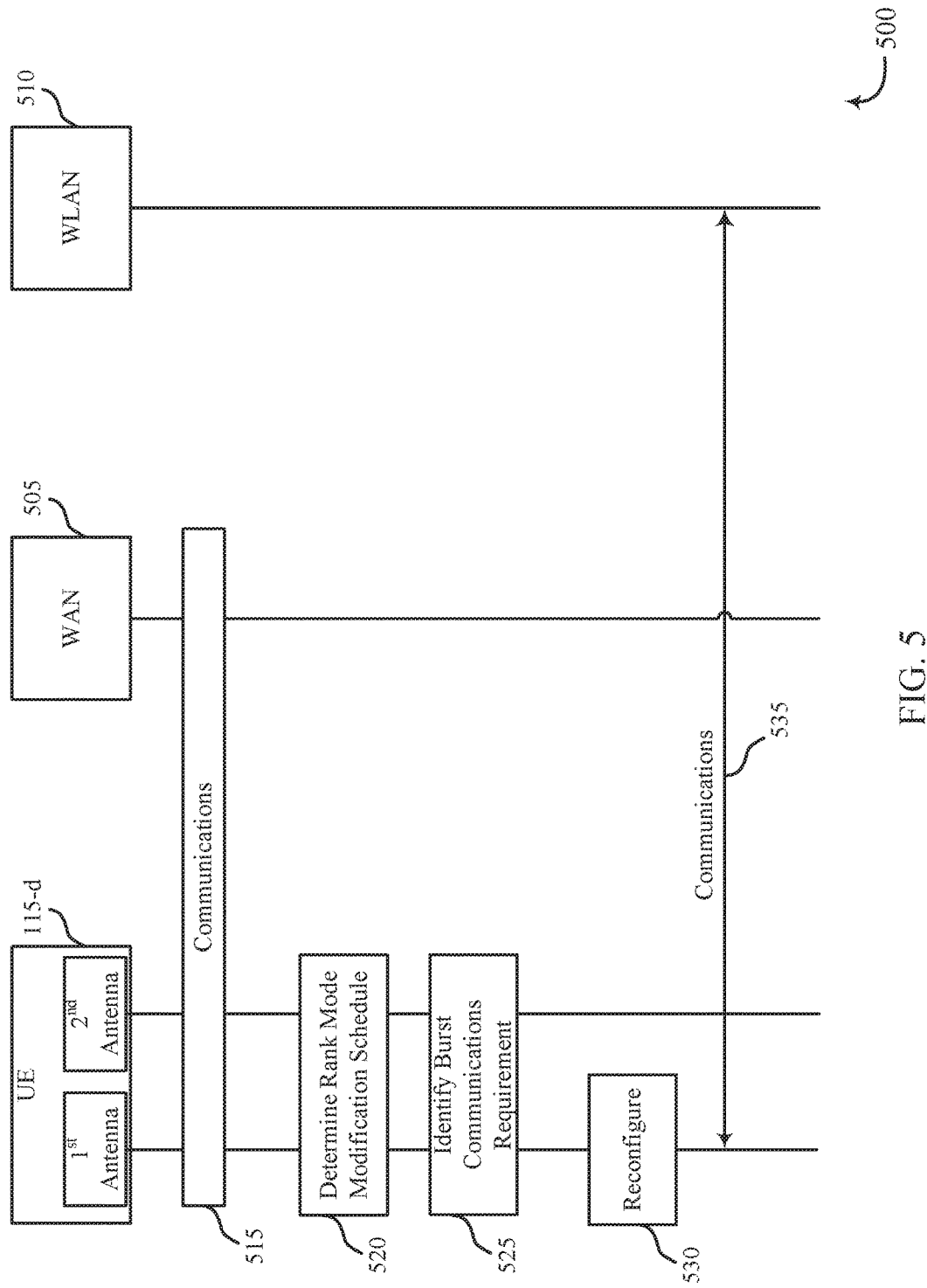
FIG. 5 illustrates an example of a process flow in a wireless communications system that supports radio frequency spectrum band harmonization in accordance with aspects of the present disclosure.

FIG. 5 shows a process flow 500 in a wireless communication system that supports radio frequency spectrum band harmonization, in accordance with various aspects of the present disclosure. Process flow 500 may include a UE 115-d, which may be an example of the corresponding device described with reference to FIGS. 1 through 4. Process flow 500 may include a WAN 505 and a WLAN 510, which may be an example of a base station 105 and an access point, respectively, as described with reference to FIG. 1. WAN 505 and WLAN 510 may also be examples of the WAN 205/305/410 and WLAN 210/310/405, respectively, as described with reference to FIGS. 2 through 4. Generally, process flow 500 illustrates an example of UE 115-d employing a micro tune-away procedure to support co-existence on a radio frequency spectrum band of different RATs.

In the example of process flow 500, the UE 115-d is shown and described as having two antennas (e.g., a first antenna and second antenna). It is to be understood that the UE 115-d may include more than two antennas. It is also to be understood that the WAN 505 may illustrate aspects of a wireless communication system that supports communications on a radio frequency spectrum band of a first RAT. In some examples, the WAN 505 may support communications on a LTE-U RAT, a LAA RAT, etc. The WAN 505 may be implemented as a base station, as a cell, etc. It is also to be understood that the WLAN 510 may illustrate aspects of a wireless communication system that supports communications on a radio frequency spectrum band of a second RAT. In some examples, the WLAN 510 may support communications on a Wi-Fi RAT, etc. The WLAN 510 may be implemented as an access point, etc.

At 515, the UE 115-d may be in communication on a radio frequency spectrum band with a first RAT. The first RAT may be a WAN RAT, e.g., a LTE-U RAT, a LAA RAT, etc., and the UE 115-d may be in communications with the WAN 505. The UE 115-d may be communicating on the radio frequency spectrum band with the WAN 505 using a set of antennas, e.g., the first and second antennas, in a full rank mode. In the full rank mode, the UE 115-d may be using all available antennas for the communications on the radio frequency spectrum band of the first RAT.

At 520, the UE 115-d may determine a rank mode modification schedule. The rank mode modification schedule may include a time period associated with the rank mode modification schedule used for communications on a radio frequency spectrum band of the first RAT. Generally, the rank mode modification schedule may provide an indication of when the WAN 505 supports changes to the current rank mode of the UE 115-d.

At 525, the UE 115-d may identify a burst communication requirement. The burst communication requirement may be based on communications on the radio frequency spectrum band of the second RAT. The burst communication requirement may have a duration that is shorter than the time period associated with the rank mode modification schedule. That is, the burst communication requirement may support scheduling the burst communication on the radio frequency spectrum band of the second RAT within the rank mode modification schedule.

At 530, the UE 115-d may reconfigure the first antenna to perform the burst communication on the radio frequency spectrum band of the second RAT. At 535, the UE 115-d may perform the burst communications on the radio frequency spectrum band of the second RAT. The burst communications may include a channel measurement procedure on the radio frequency spectrum band of the second RAT, in some examples. The UE 115-d may refrain from transmitting a message to WAN 505 providing an indication that the first antenna has been reconfigured.

In some examples, the burst communications may include using the reconfigured antenna for short durations.

Examples of the short duration burst communication may include, but are not limited to, a neighbor-aware network (NAN) duration, search and measurement scans, etc. After or in between the micro tune-away procedures for the burst communications, the UE 115-d may reconfigure the first antenna (and/or the second antenna) for WAN communications, e.g., for keep alive transmissions to WAN 505. In some aspects, the UE 115-d may also imitate or fake decoding of downlink signals from WAN 505 (e.g., sending forced acknowledgement messages for each downlink transmission from the network) to hide the micro tune-away procedure from the network/WAN 505.

In some examples, reconfiguring the first antenna to perform the burst communications on the radio frequency spectrum band of the second RAT may not be based on the rank mode modification schedule. For example, the UE 115-d may identify the burst communication requirement and reconfigure the first antenna based on the smart scheduling techniques described above.

Figure 6:
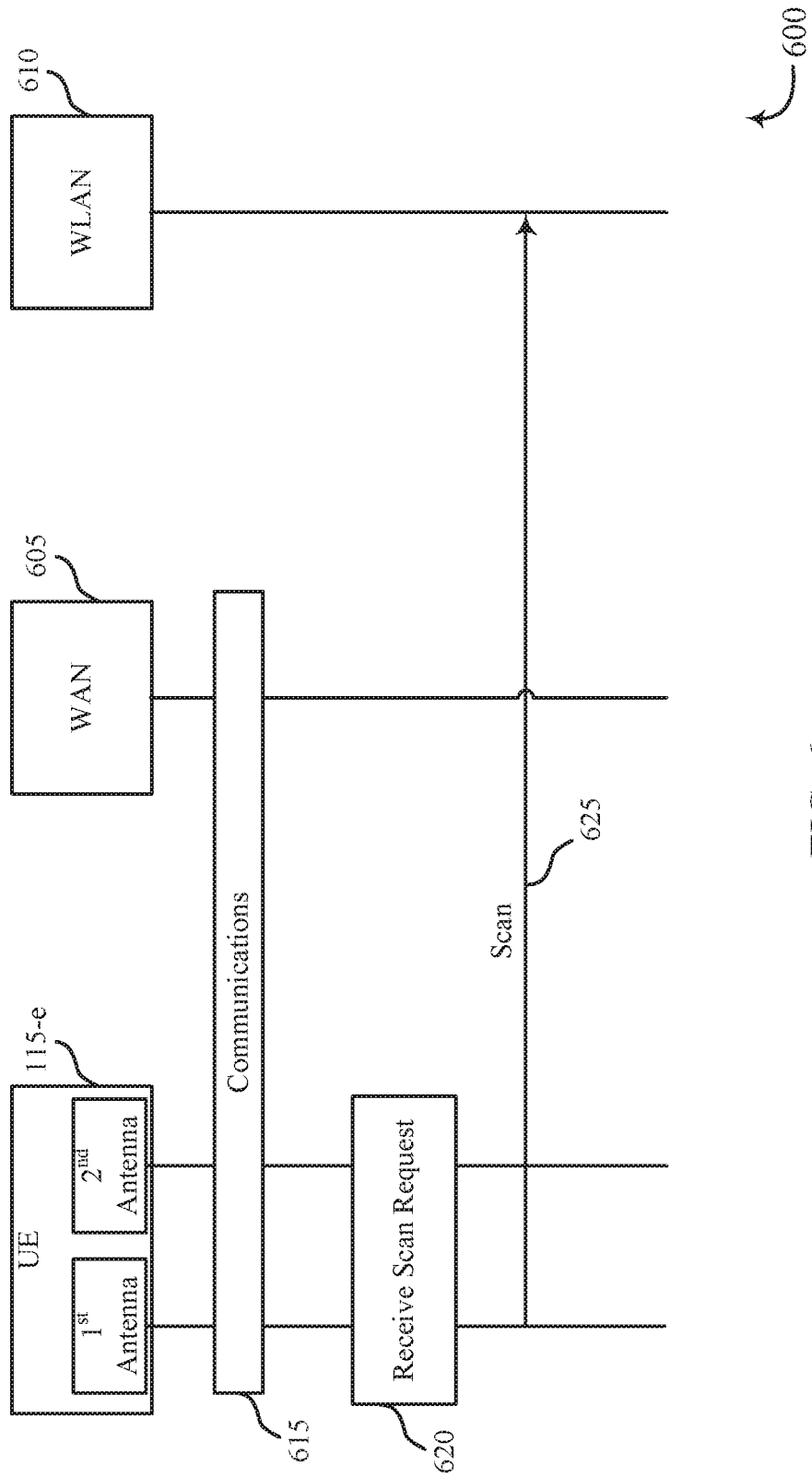
FIG. 6 illustrates an example of a process flow in a wireless communications system that supports radio frequency spectrum band harmonization in accordance with aspects of the present disclosure.

FIG. 6 shows a process flow 600 for use in a wireless communication system that supports radio frequency spectrum band harmonization, in accordance with various aspects of the present disclosure. Process flow 600 may include a UE 115-e, which may be an example of the corresponding device described with reference to FIGS. 1 through 5. Process flow 600 may include a WAN 605 and a WLAN 610, which may be an example of a base station 105 and an access point, respectively, as described with reference to FIG. 1. WAN 605 and WLAN 610 may also be examples of the WAN 205/305/410/505 and WLAN 210/310/405/510, respectively, as described with reference to FIGS. 2 through 5. Generally, process flow 600 illustrates an example of UE 115-e employing a WAN assisted WLAN measurement procedure to support co-existence on a radio frequency spectrum band of different RATs.

In the example of process flow 600, the UE 115-e is shown and described as having two antennas (e.g., a first antenna and second antenna). It is to be understood that the UE 115-e may include more than two antennas. It is also to be understood that the WAN 605 may illustrate aspects of a wireless communication system that supports communications on a radio frequency spectrum band of a first RAT. In some examples, the WAN 605 may support communications on a LTE-U RAT, a LAA RAT, etc. The WAN 605 may be implemented as a base station, a cell, etc. It is also to be understood that the WLAN 610 may illustrate aspects of a wireless communication system that supports communications on a radio frequency spectrum band of a second RAT. In some examples, the WLAN 610 may support communications on a Wi-Fi RAT, etc. The WLAN 610 may be implemented as an access point, etc.

At 615, the UE 115-d may be in communication on a radio frequency spectrum band with a first RAT. For example, the UE 115-e may configure the first and second antennas for communications on a radio frequency spectrum band of the first RAT. The first RAT may be a WAN RAT, e.g., a LTE-U RAT, a LAA RAT, etc., and the UE 115-e may be in communications with the WAN 605. The UE 115-e may be communicating on the radio frequency spectrum band with the WAN 605 using a set of antennas, e.g., the first and second antennas, in a full rank mode. In the full rank mode, the UE 115-e may be using all available antennas for the communications on the radio frequency spectrum band of the first RAT.

At 620, the UE 115-e may receiving a scan request associated with performing a scan on the radio frequency spectrum band of the second RAT, e.g., the WLAN RAT. The scan may include a channel measurement scan, etc. At 625, the UE 115-e may perform the scan on the radio frequency spectrum band of the second RAT, e.g., the UE 115-e may scan the WLAN 610 RAT. The UE 115-e may provide an output indicative of the scan result of the scan. For example, the UE 115-e may provide an output from a WAN subsystem, layer, or stack to a WLAN subsystem, layer, or stack of the UE 115-e indicative of the scan results.

In some aspects, performing the scan may include decoding at least a portion of a message received on the radio frequency spectrum band of the second RAT during the scan. Decoding the portion may include decoding a preamble portion of the message. The UE 115-e may, based on the decoded preamble, determine if the received message is associated with an access point, a specific access point, etc. The output indicative of the scan result may include an indication of the decoded portion of the message. In some examples, the UE 115-e may determine whether to include information associated with the received message based on the decoded portion of the message.

In some aspects, the UE 115-e may schedule the scan on the radio frequency spectrum band of the second RAT during periods of reduced WAN communications. For example, the UE 115-e may identify a time period in which WAN communications are reduced, not scheduled, etc. The UE 115-e may schedule the WLAN scan during the identified time periods. In one example, the time period may be a transmit time interval (TTI), e.g., a subframe in some examples. For example, the UE 115-e may decode a first portion of a WAN received signal and determine whether the remaining portion includes scheduled WAN communications. If no WAN communications are scheduled, the UE 115-e may perform the scan on the radio frequency spectrum band of the second RAT.

Figure 7:
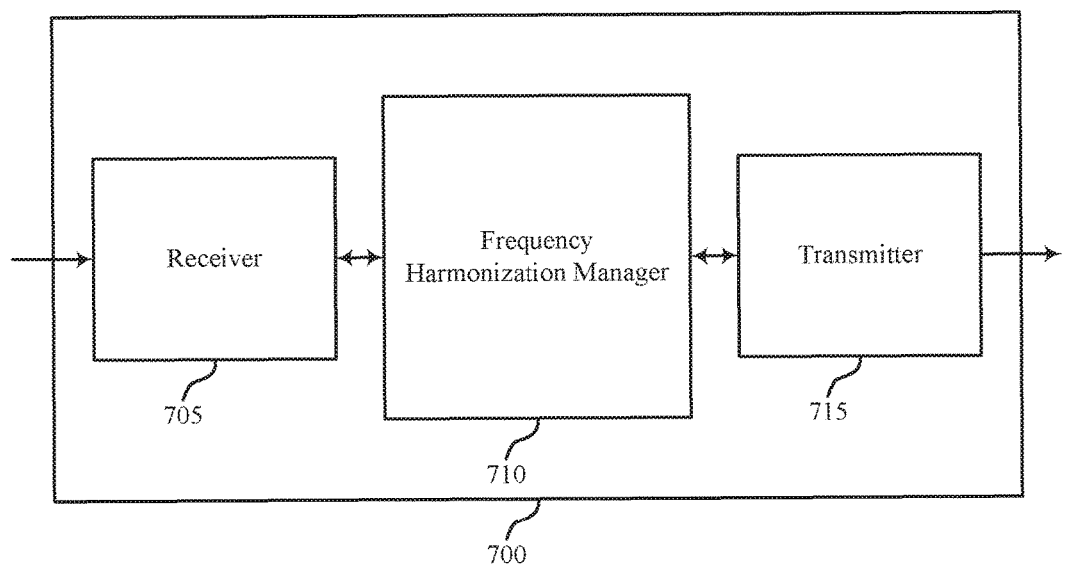
FIGS. 7 through 9 show block diagrams of a wireless device that supports radio frequency spectrum band harmonization in accordance with aspects of the present disclosure.

FIG. 7 shows a block diagram of a wireless device 700 that supports radio frequency spectrum band harmonization in accordance with various aspects of the present disclosure. Wireless device 700 may be an example of aspects of a UE 115 described with reference to FIGS. 1 through 6. Wireless device 700 may include receiver 705, frequency harmonization manager 710 and transmitter 715. Wireless device 700 may also include a processor. Each of these components may be in communication with each other.

The receiver 705 may receive information such as packets, user data, or control information associated with various information channels (e.g., control channels, data channels, and information related to radio frequency spectrum band harmonization, etc.). Information may be passed on to other components of the device. The receiver 705 may be an example of aspects of the transceiver 1025 described with reference to FIG. 10.

The frequency harmonization manager 710 may communicate on a radio frequency spectrum band of a first RAT using a set of antennas, reconfigure at least one antenna of the set of antennas to perform a first scan on the radio frequency spectrum band of a second RAT, and determine, based on the first scan, whether to reconfigure a remaining portion of antennas of the set of antennas to perform a second scan on the radio frequency spectrum band of the second RAT. The frequency harmonization manager 710 may also be an example of aspects of the frequency harmonization manager 1005 described with reference to FIG. 10.

Additionally or alternatively, the frequency harmonization manager 710 may identify a priority metric for communications during a time period on a radio frequency spectrum band of a first RAT, reconfigure, based on the priority metric, at least one antenna of a set of antennas to perform a scan on the radio frequency spectrum band of a second RAT, and perform the scan during the time period on the radio frequency spectrum band of the second RAT.

Additionally or alternatively, the frequency harmonization manager 710 may communicate on a radio frequency spectrum band of a first RAT using a set of antennas, the set of antennas based on a rank mode associated with the communications, determine, for at least one antenna of the set of antennas, that a demand requirement associated with the communications is below a threshold level, and reconfigure, based on the demand requirement, the at least one antenna of the set of antennas to perform communications on the radio frequency spectrum band of a second RAT.

Additionally or alternatively, the frequency harmonization manager 710 may identify a time period associated with a rank mode modification schedule used for communications on a radio frequency spectrum band of a first RAT identify a burst communication requirement on the radio frequency spectrum band of a second RAT, the burst communication requirement including a duration that is shorter than the time period associated with the rank mode modification schedule, and reconfigure, based on the duration being shorter in time, the at least one antenna of the set of antennas to perform burst communications during the duration on the radio frequency spectrum band of the second RAT, Additionally or alternatively, the frequency harmonization manager 710 may configure at least one antenna of a set of antennas for communications on a radio frequency spectrum band of a first RAT receive a scan request associated with performing a scan on the radio frequency spectrum band of a second RAT, and perform, based on the scan request, the scan on the radio frequency spectrum band of the second RAT, provide an output indicative of a scan result associated with the scan, The transmitter 715 may transmit signals received from other components of wireless device 700. In some examples, the transmitter 715 may be collocated with a receiver in a transceiver module. For example, the transmitter 715 may be an example of aspects of the transceiver 1025 described with reference to FIG. 10. The transmitter 715 may include a single antenna, or it may include a plurality of antennas.

Although an antenna or antennas are described as examples in the present disclosure, the techniques and methods described herein apply to various other resources associated with at least one device (e.g., a UE 115, an AP 106, or a base station 105, among others). Additional resources may include, but are not limited to, modem hardware (e.g., a processing unit of a modem), baseband hardware, a radio frequency (RF) front end, an RF back end, RF chip components (e.g., a number of oscillators), other resources, or a combination thereof. As such, the described techniques and methods also apply to other resources associated with at least one device, and examples and embodiments based on these other resources are contemplated.

Figure 8:
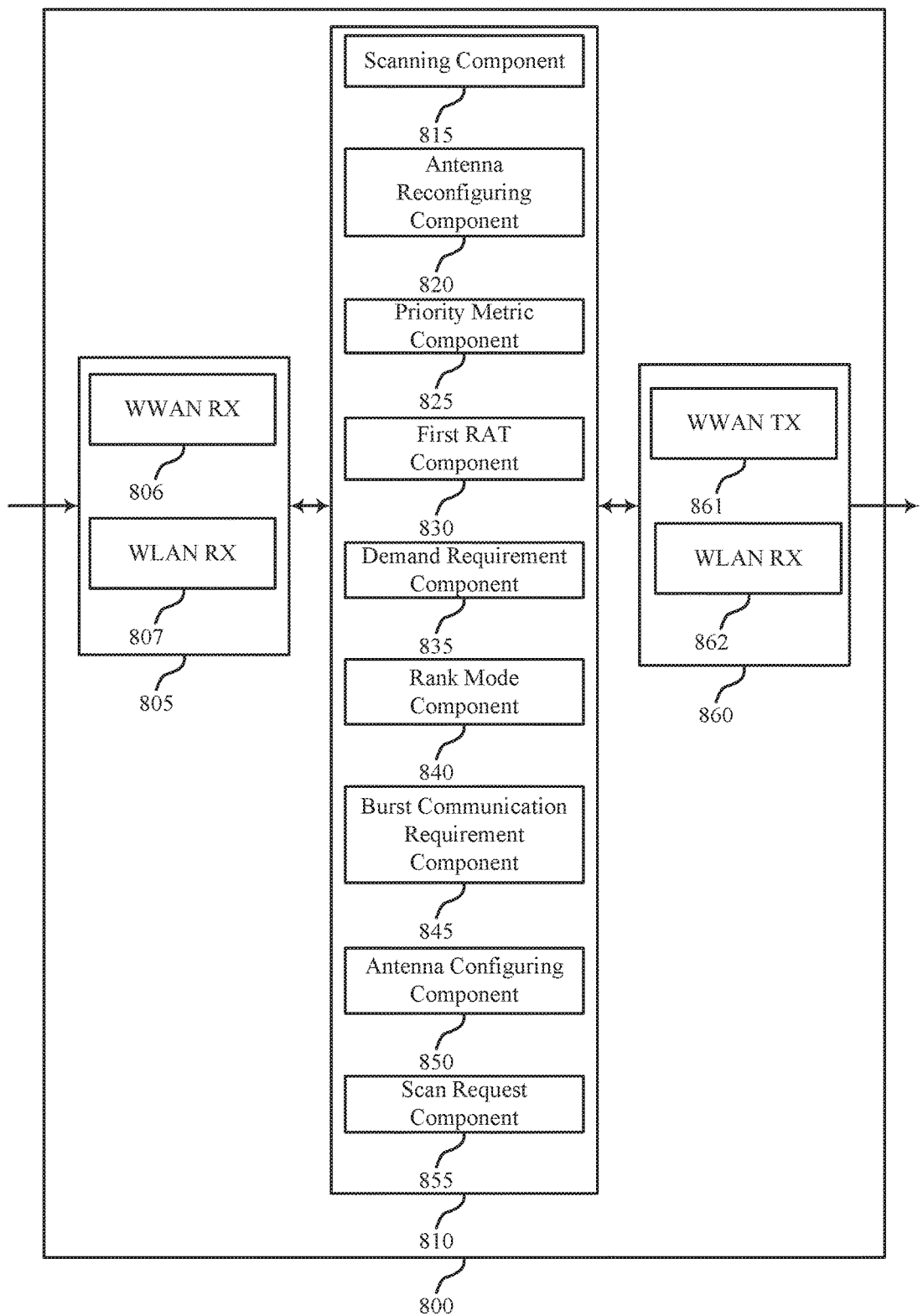

FIG. 8 shows a block diagram of a wireless device 800 that supports radio frequency spectrum band harmonization in accordance with various aspects of the present disclosure. Wireless device 800 may be an example of aspects of a wireless device 700 or a UE 115 described with reference to FIGS. 1 through 7. Wireless device 800 may include receiver 805, frequency harmonization manager 810 and transmitter 860. Wireless device 800 may also include a processor. Each of these components may be in communication with each other.

The receiver 805 may receive information which may be passed on to other components of the device. The receiver 805 may also perform the functions described with reference to the receiver 705 of FIG. 7. The receiver 805 may be an example of aspects of the transceiver 1025 described with reference to FIG. 10. Receiver 805 may include WWAN receiver 806 (which may be a component of a WWAN transceiver) and WLAN receiver 807 (which may be a component of a WLAN transceiver).

The frequency harmonization manager 810 may be an example of aspects of frequency harmonization manager 710 described with reference to FIG. 7. The frequency harmonization manager 810 may include scanning component 815, antenna reconfiguring component 820, priority metric component 825, first RAT component 830, demand requirement component 835, rank mode component 840, burst communication requirement component 845, antenna configuring component 850 and scan request component 855. The frequency harmonization manager 810 may be an example of aspects of the frequency harmonization manager 1005 described with reference to FIG. 10.

The scanning component 815 may perform scanning operations as described herein. The scanning component 815 may also determine, based on the first scan, that at least one access point of a set of access points is detected during the first scan, determine that the first scan is associated with a priority scan, perform the scan during the time period on the radio frequency spectrum band of the second RAT, perform, based on the scan request, the scan on the radio frequency spectrum band of the second RAT, provide an output indicative of a scan result associated with the scan, and schedule the scan to be performed during the time period.

In some cases, performing the scan on the radio frequency spectrum band of the second RAT includes interfering with the communications during the time period on the first RAT. In some cases, the scan includes a dual antenna tune-away procedure. In some cases, the time period includes at least a portion of a transmit time interval.

The antenna reconfiguring component 820 may configure or reconfigure at least one antenna as described herein. In some cases, the antenna reconfiguring component 820 may also refrain from reconfiguring the remaining portion of antennas of the set of antennas to perform the second scan, or refrain from reconfiguring the remaining portion of antennas of the set of antennas to perform the second scan.

The antenna reconfiguring component 820 may also reconfigure, based on the channel scan distribution value, the at least one antenna of the set of antennas to perform the first scan on the radio frequency spectrum band of the second RAT, reconfigure the remaining portion of antennas of the set of antennas to perform the priority scan, or refrain from reconfiguring the at least one antenna of the set of antennas to perform the first scan.

The antenna reconfiguring component 820 may also reconfigure the at least one antenna, the remaining portion of antennas, or combinations thereof, of the set of antennas to perform the first and second scans during the time period, reconfigure, based on the priority metric, at least one antenna of a set of antennas to perform a scan on the radio frequency spectrum band of a second RAT, or reconfigure, based on the demand requirement, the at least one antenna of the set of antennas to perform communications on the radio frequency spectrum band of a second RAT.

The antenna reconfiguring component 820 may reconfigure the at least one antenna of the set of antennas to perform communications on the radio frequency spectrum band of the second RAT, reconfigure, based on the duration being shorter in time, the at least one antenna of the set of antennas to perform burst communications during the duration on the radio frequency spectrum band of the second RAT, reconfigure at least one antenna of the set of antennas to perform a first scan on the radio frequency spectrum band of a second RAT, determine, based on the first scan, whether to reconfigure a remaining portion of antennas of the set of antennas to perform a second scan on the radio frequency spectrum band of the second RAT, and refrain from reconfiguring the remaining portion of antennas of the set of antennas to perform the second scan.

The priority metric component 825 may identify a priority metric for the communications during a time period on the radio frequency spectrum band of the first RAT, identify a priority metric for communications during a time period on a radio frequency spectrum band of a first RAT and identify a priority metric for communications during a time period on the radio frequency spectrum band of the first RAT.

In some cases, the priority metric indicates that the communications during the time period include at least one blank subframe, including: performing the scan during the at least one blank subframe on the radio frequency spectrum band of the second RAT to avoid interfering with the communications during the time period of the communications on the radio frequency spectrum band of the first RAT.

The first RAT component 830 may communicate on a radio frequency spectrum band of a first RAT using a set of antennas, the set of antennas based on a rank mode associated with the communications, and communicate on a radio frequency spectrum band of a first RAT using a set of antennas.

The demand requirement component 835 may determine, for at least one antenna of the set of antennas, that a demand requirement associated with the communications is below a threshold level. In some cases, the demand requirement indicates that the communications are associated with a throughput requirement below a threshold level. In some cases, the demand requirement indicates that the communications are associated with a channel condition parameter above a threshold value. In some cases, the demand requirement indicates that the communications are associated with a predefined modulation and coding scheme.

The rank mode component 840 may identify a time period associated with a rank mode modification schedule used for communications on a radio frequency spectrum band of a first RAT.

The burst communication requirement component 845 may identify a burst communication requirement on the radio frequency spectrum band of a second RAT, the burst communication requirement including a duration that is shorter than the time period associated with the rank mode modification schedule. In some cases, the burst communications include a channel measurement procedure on the radio frequency spectrum band of the second RAT.

The antenna configuring component 850 may configure at least one antenna of a set of antennas for communications on a radio frequency spectrum band of a first RAT. The scan request component 855 may receive a scan request associated with performing a scan on the radio frequency spectrum band of a second RAT.

The transmitter 860 may transmit signals received from other components of wireless device 800. In some examples, the transmitter 860 may be collocated with a receiver in a transceiver module. For example, the transmitter 860 may be an example of aspects of the transceiver 1025 described with reference to FIG. 10. The transmitter 860 may utilize a single antenna, or it may utilize a plurality of antennas. Transmitter 860 may include WWAN transmitter 861 (which may be a component of a WWAN transceiver) and WLAN transmitter 862 (which may be a component of a WLAN transceiver).

Figure 9:
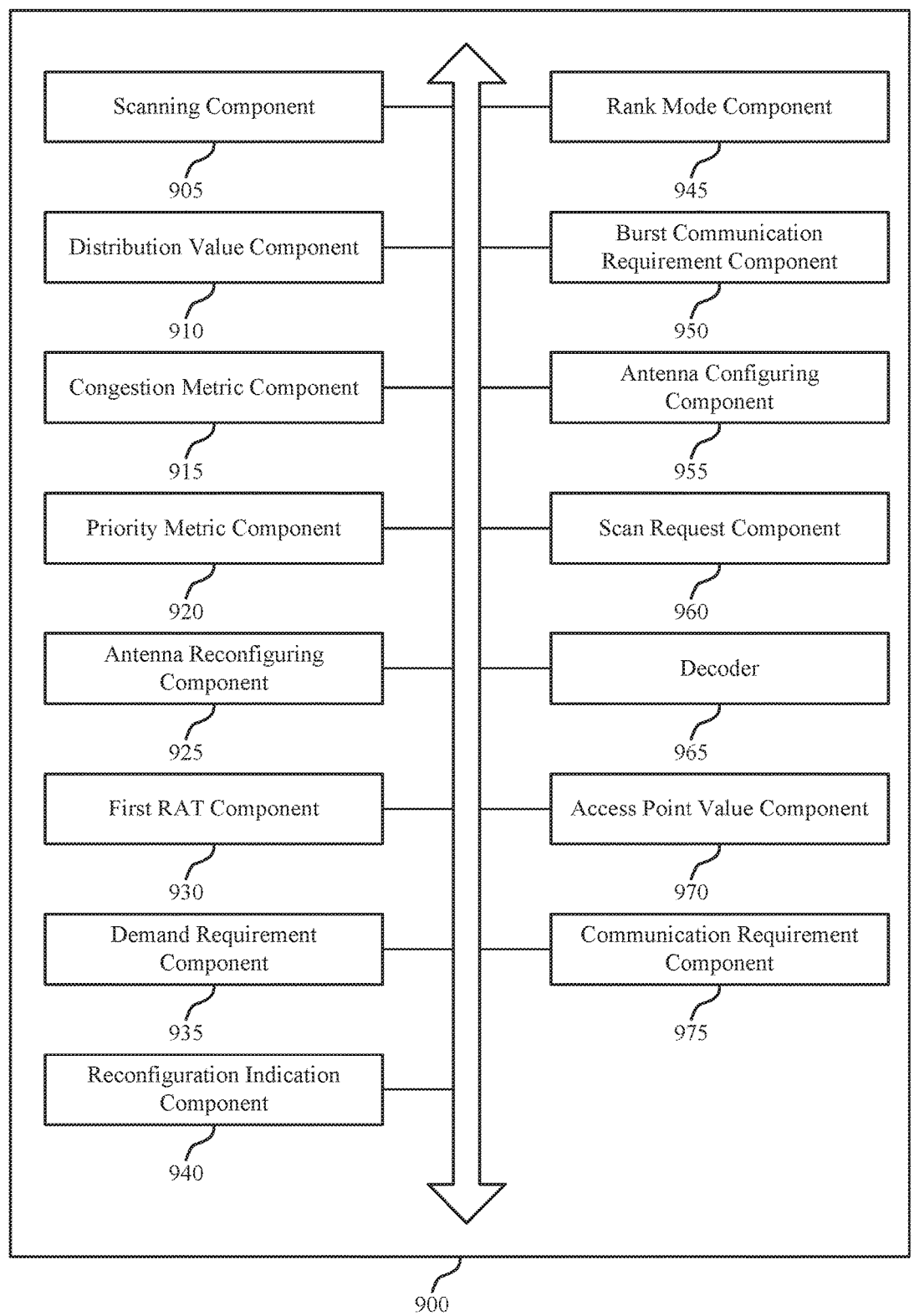

FIG. 9 shows a block diagram of a frequency harmonization manager 900 which may be an example of the corresponding component of wireless device 700 or wireless device 800. That is, frequency harmonization manager 900 may be an example of aspects of frequency harmonization manager 710 or frequency harmonization manager 810 described with reference to FIGS. 7 and 8. The frequency harmonization manager 900 may also be an example of aspects of the frequency harmonization manager 1005 described with reference to FIG. 10.

The frequency harmonization manager 900 may include scanning component 905, distribution value component 910, congestion metric component 915, priority metric component 920, antenna reconfiguring component 925, first RAT component 930, demand requirement component 935, reconfiguration indication component 940, rank mode component 945, burst communication requirement component 950, antenna configuring component 955, scan request component 960, decoder 965, access point value component 970 and communication requirement component 975. Each of these modules may communicate, directly or indirectly, with one another (e.g., via at least one bus).

The scanning component 905 may determine, based on the first scan, that at least one access point of a set of access points is detected during the first scan, determine that the first scan is associated with a priority scan, perform the scan during the time period on the radio frequency spectrum band of the second RAT, perform, based on the scan request, the scan on the radio frequency spectrum band of the second RAT, provide an output indicative of a scan result associated with the scan, and schedule the scan to be performed during the time period. In some cases, performing the scan on the radio frequency spectrum band of the second RAT includes interfering with the communications during the time period on the first RAT. In some cases, the scan includes a dual antenna tune-away procedure. In some cases, the time period includes at least a portion of a transmit time interval.

The distribution value component 910 may determine that a channel scan distribution value for a set of radio frequency spectrum bands is within a predefined deviation value.

The congestion metric component 915 may determine that a congestion metric associated with a different radio frequency spectrum band is above a threshold level.

The priority metric component 920 may identify a priority metric for the communications during a time period on the radio frequency spectrum band of the first RAT, identify a priority metric for communications during a time period on a radio frequency spectrum band of a first RAT and identify a priority metric for communications during a time period on the radio frequency spectrum band of the first RAT.

The antenna reconfiguring component 925 may configure or reconfigure at least one antenna as described herein. In some cases, the antenna reconfiguring component 925 may also refrain from reconfiguring the remaining portion of antennas of the set of antennas to perform the second scan, or refrain from reconfiguring the remaining portion of antennas of the set of antennas to perform the second scan.

The antenna reconfiguring component 925 may also reconfigure, based on the channel scan distribution value, the at least one antenna of the set of antennas to perform the first scan on the radio frequency spectrum band of the second RAT, reconfigure the remaining portion of antennas of the set of antennas to perform the priority scan, or refrain from reconfiguring the at least one antenna of the set of antennas to perform the first scan.

The antenna reconfiguring component 925 may also reconfigure the at least one antenna, the remaining portion of antennas, or combinations thereof, of the set of antennas to perform the first and second scans during the time period, reconfigure, based on the priority metric, at least one antenna of a set of antennas to perform a scan on the radio frequency spectrum band of a second RAT, or reconfigure, based on the demand requirement, the at least one antenna of the set of antennas to perform communications on the radio frequency spectrum band of a second RAT.

The antenna reconfiguring component 925 may reconfigure the at least one antenna of the set of antennas to perform communications on the radio frequency spectrum band of the second RAT, reconfigure, based on the duration being shorter in time, the at least one antenna of the set of antennas to perform burst communications during the duration on the radio frequency spectrum band of the second RAT, reconfigure at least one antenna of the set of antennas to perform a first scan on the radio frequency spectrum band of a second RAT, determine, based on the first scan, whether to reconfigure a remaining portion of antennas of the set of antennas to perform a second scan on the radio frequency spectrum band of the second RAT, and refrain from reconfiguring the remaining portion of antennas of the set of antennas to perform the second scan.

The first RAT component 930 may communicate on a radio frequency spectrum band of a first RAT using a set of antennas, the set of antennas based on a rank mode associated with the communications, and communicate on a radio frequency spectrum band of a first RAT using a set of antennas.

The demand requirement component 935 may determine, for at least one antenna of the set of antennas, that a demand requirement associated with the communications is below a threshold level. In some cases, the demand requirement indicates that the communications are associated with a throughput requirement below a threshold level. In some cases, the demand requirement indicates that the communications are associated with a channel condition parameter above a threshold value. In some cases, the demand requirement indicates that the communications are associated with a predefined modulation and coding scheme.

The reconfiguration indication component 940 may transmit a message to an access point including an indication that the at least one antenna of the set of antennas has been reconfigured, and refrain from transmitting a message to a base station indicating that the at least one antenna of the set of antennas has been reconfigured. In some cases, the message includes a multiple-input/multiple-output (MIMO) power save (PS) action frame.

The rank mode component 945 may identify a time period associated with a rank mode modification schedule used for communications on a radio frequency spectrum band of a first RAT.

The burst communication requirement component 950 may identify a burst communication requirement on the radio frequency spectrum band of a second RAT, the burst communication requirement including a duration that is shorter than the time period associated with the rank mode modification schedule. In some cases, the burst communications include a channel measurement procedure on the radio frequency spectrum band of the second RAT.

The antenna configuring component 955 may configure at least one antenna of a set of antennas for communications on a radio frequency spectrum band of a first RAT.

The scan request component 960 may receive a scan request associated with performing a scan on the radio frequency spectrum band of a second RAT. The decoder 965 may decode at least a portion of a message received during the scan, and determine, based on the decoded portion of the message, whether to include information associated with the message in the scan result.

The access point value component 970 may determine, based on the first scan, that an access point count is greater than a threshold level, and determine, based on the first scan, that an access point count value is less than a channel condition metric. The communication requirement component 975 may identify a reduced communication requirement for a time period associated with the communications on the radio frequency spectrum band of the first RAT.

Figure 10:
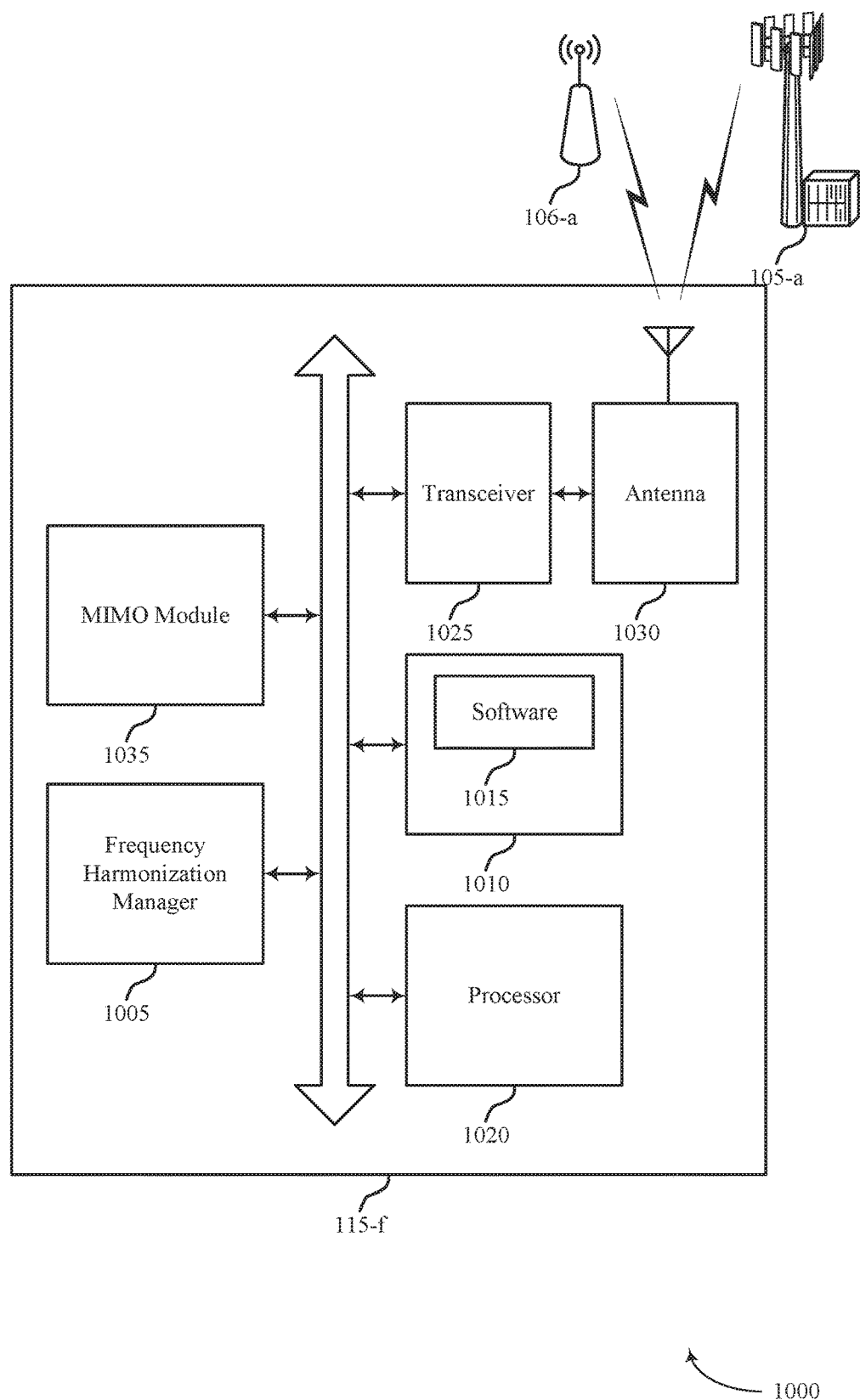
FIG. 10 illustrates a block diagram of a system including a UE that supports radio frequency spectrum band harmonization in accordance with aspects of the present disclosure.

FIG. 10 shows a diagram of a system 1000 including a device that supports radio frequency spectrum band harmonization in accordance with various aspects of the present disclosure. For example, system 1000 may include UE 115-*f*, which may be an example of a wireless device 700, a wireless device 800, or a UE 115 as described with reference to FIGS. 1 through 9.

UE 115-*f* may also include frequency harmonization manager 1005, memory 1010, processor 1020, transceiver 1025, antenna 1030 and MIMO module 1035. Each of these modules may communicate, directly or indirectly, with one another (e.g., via at least one bus). The frequency harmonization manager 1005 may be an example of a frequency harmonization manager as described with reference to FIGS. 7 through 9.

The memory 1010 may include random access memory (RAM) and read only memory (ROM). The memory 1010 may store computer-readable, computer-executable software including instructions that, when executed, cause the processor to perform various functions described herein (e.g., radio frequency spectrum band harmonization, etc.). In some cases, the software 1015 may not be directly executable by the processor but may cause a computer (e.g., when compiled and executed) to perform functions described herein. The processor 1020 may include an intelligent hardware device, (e.g., a central processing unit (CPU), a microcontroller, an application specific integrated circuit (ASIC), etc.)

The transceiver 1025 may communicate bi-directionally, via at least one antenna, wired, or wireless links, with at least one network, as described above. For example, the transceiver 1025 may communicate bi-directionally with a base station 105 or a UE 115. The transceiver 1025 may also include a modem to modulate the packets and provide the modulated packets to the antennas for transmission, and to demodulate packets received from the antennas. In some cases, the transceiver 1025 may include distinct transceiver components for communicating with a WLAN and a WWAN.

In some cases, the wireless device may include a single antenna 1030. However, in some cases the device may have more than one antenna 1030, which may be capable of concurrently transmitting or receiving multiple wireless transmissions. MIMO module 1035 may enable MIMO operations using the at least one antenna as described above with reference to FIG. 1.

Although an antenna or antennas are described as examples in the present disclosure, the techniques and the methods described herein apply to various other resources associated with at least one device (e.g., a UE 115, an AP 106, or a base station 105, among others). Additional resources may include, but are not limited to, modem hardware (e.g., a processing unit of a modem), baseband hardware, a radio frequency (RF) front end, an RF back end, RF chip components (e.g., a number of oscillators), other resources, or a combination thereof. As such, the described techniques and methods also apply to other resources associated with at least one device, and examples and embodiments based on these other resources are contemplated.

Figure 11:
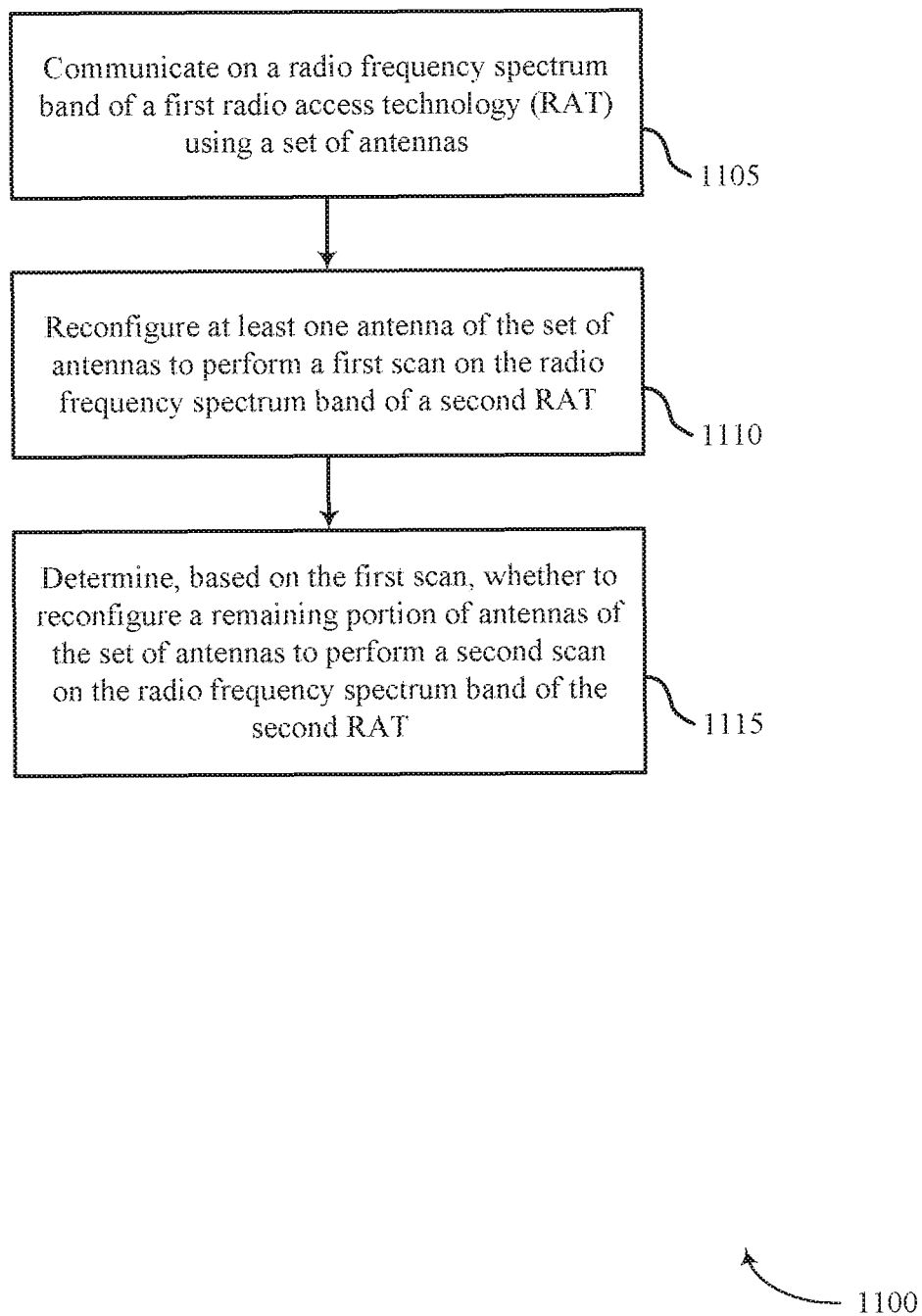
FIGS. 11 through 15 illustrate methods for radio frequency spectrum band harmonization in accordance with aspects of the present disclosure.

FIG. 11 shows a flowchart illustrating a method 1100 for radio frequency spectrum band harmonization in accordance with various aspects of the present disclosure. The operations of method 1100 may be implemented by a device such as a UE 115 or its components as described with reference to FIGS. 1 through 6. For example, the operations of method 1100 may be performed by the frequency harmonization manager as described herein. In some examples, the UE 115 may execute a set of codes to control the functional elements of the device to perform the functions described below. Additionally or alternatively, the UE 115 may perform aspects the functions described below using special-purpose hardware.

At block 1105, the UE 115 may communicate on a radio frequency spectrum band of a first RAT using a set of antennas as described above with reference to FIGS. 2 through 6. In certain examples, the operations of block 1105 may be performed by the first RAT component as described with reference to FIGS. 8 and 9.

At block 1110, the UE 115 may reconfigure at least one antenna of the set of antennas to perform a first scan on the radio frequency spectrum band of a second RAT as described above with reference to FIGS. 2 through 6. In certain examples, the operations of block 1110 may be performed by the antenna reconfiguring component as described with reference to FIGS. 8 and 9.

At block 1115, the UE 115 may determine, based on the first scan, whether to reconfigure a remaining portion of antennas of the set of antennas to perform a second scan on the radio frequency spectrum band of the second RAT as described above with reference to FIGS. 2 through 6. In certain examples, the operations of block 1115 may be performed by the antenna reconfiguring component as described with reference to FIGS. 8 and 9.

Although an antenna or antennas are described as examples in the present disclosure, the techniques and the methods described herein apply to various other resources associated with at least one device (e.g., a UE 115, an AP 106, or a base station 105, among others). Additional resources may include, but are not limited to, modem hardware (e.g., a processing unit of a modem), baseband hardware, a radio frequency (RF) front end, an RF back end, RF chip components (e.g., a number of oscillators), other resources, or a combination thereof. As such, the described techniques and methods also apply to other resources associated with at least one device, and examples and embodiments based on these other resources are contemplated.

Figure 12:
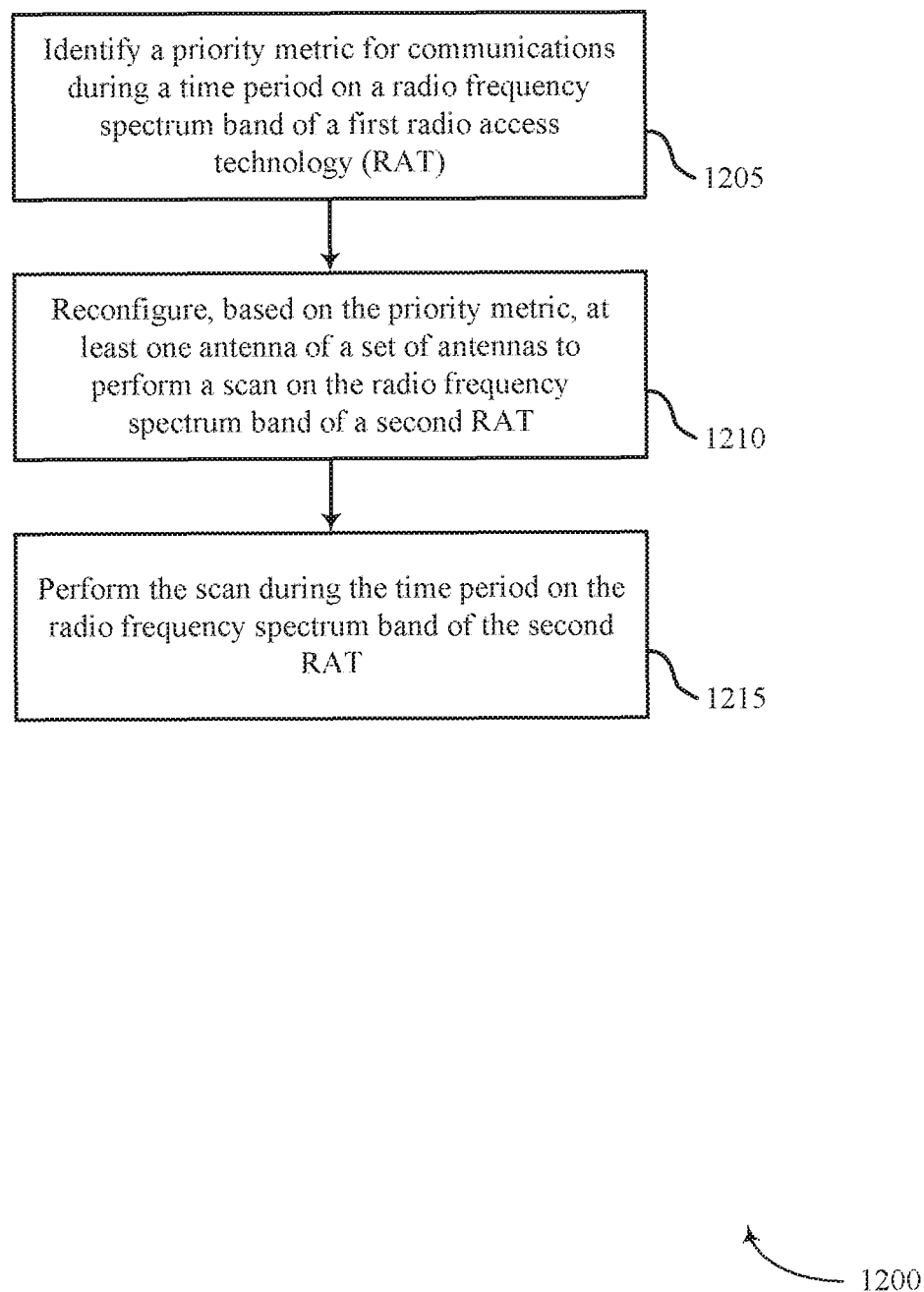

FIG. 12 shows a flowchart illustrating a method 1200 for radio frequency spectrum band harmonization in accordance with various aspects of the present disclosure. The operations of method 1200 may be implemented by a device such as a UE 115 or its components as described with reference to FIGS. 1 through 6. For example, the operations of method 1200 may be performed by the frequency harmonization manager as described herein. In some examples, the UE 115 may execute a set of codes to control the functional elements of the device to perform the functions described below. Additionally or alternatively, the UE 115 may perform aspects the functions described below using special-purpose hardware.

At block 1205, the UE 115 may identify a priority metric for communications during a time period on a radio frequency spectrum band of a first RAT as described above with reference to FIGS. 2 through 6. In certain examples, the operations of block 1205 may be performed by the priority metric component as described with reference to FIGS. 8 and 9.

At block 1210, the UE 115 may reconfigure, based on the priority metric, at least one antenna of a set of antennas to perform a scan on the radio frequency spectrum band of a second RAT as described above with reference to FIGS. 2 through 6. In certain examples, the operations of block 1210 may be performed by the antenna reconfiguring component as described with reference to FIGS. 8 and 9.

At block 1215, the UE 115 may perform the scan during the time period on the radio frequency spectrum band of the second RAT as described above with reference to FIGS. 2 through 6. In certain examples, the operations of block 1215 may be performed by the scanning component as described with reference to FIGS. 8 and 9.

Although an antenna or antennas are described as examples in the present disclosure, the techniques and the methods described herein apply to various other resources associated with at least one device (e.g., a UE 115, an AP 106, or a base station 105, among others). Additional resources may include, but are not limited to, modem hardware (e.g., a processing unit of a modem), baseband hardware, a radio frequency (RF) front end, an RF back end, RF chip components (e.g., a number of oscillators), other resources, or a combination thereof. As such, the described techniques and methods also apply to other resources associated with at least one device, and examples and embodiments based on these other resources are contemplated.

Figure 13:
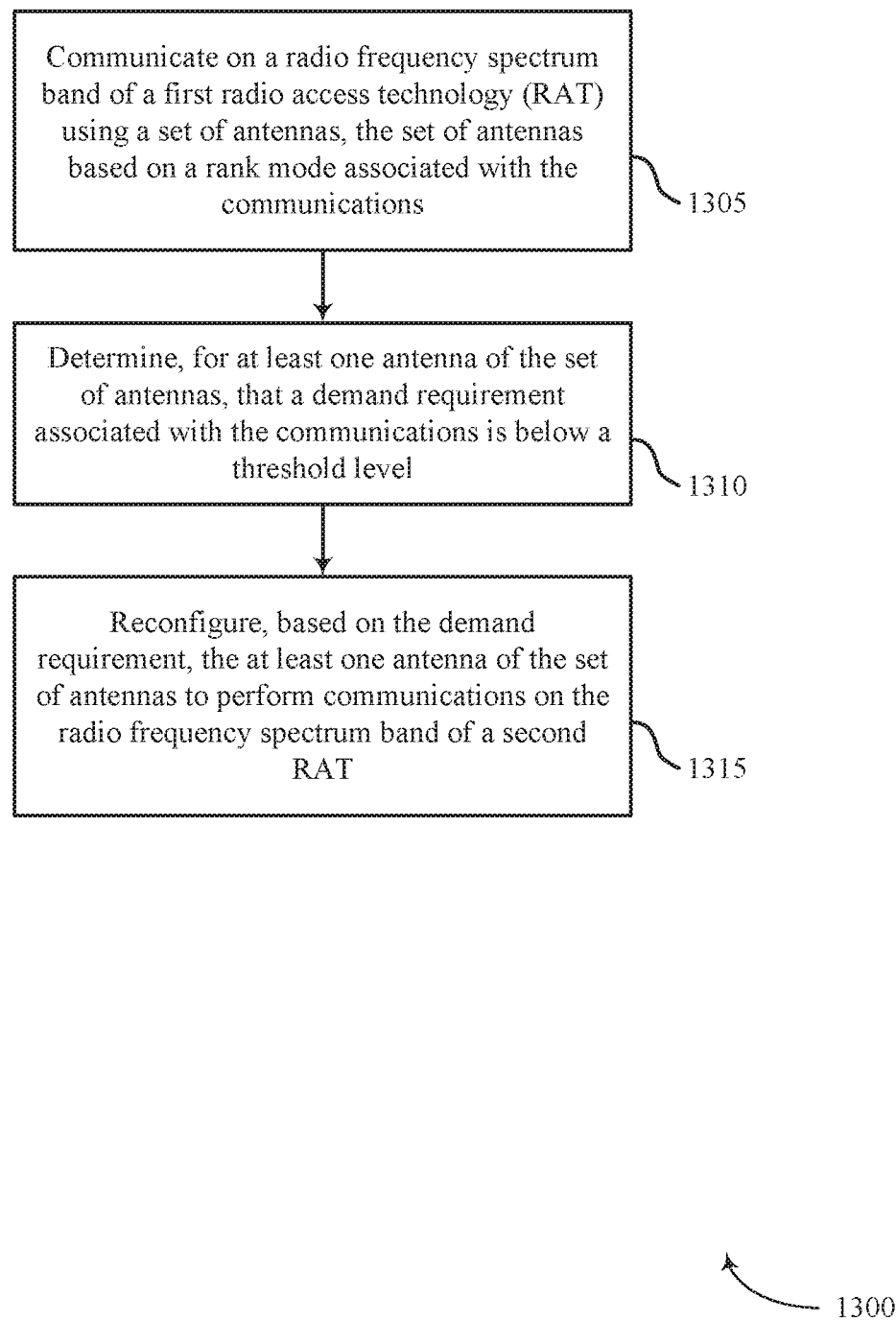

FIG. 13 shows a flowchart illustrating a method 1300 for radio frequency spectrum band harmonization in accordance with various aspects of the present disclosure. The operations of method 1300 may be implemented by a device such as a UE 115 or its components as described with reference to FIGS. 1 through 6. For example, the operations of method 1300 may be performed by the frequency harmonization manager as described herein. In some examples, the UE 115 may execute a set of codes to control the functional elements of the device to perform the functions described below. Additionally or alternatively, the UE 115 may perform aspects the functions described below using special-purpose hardware.

At block 1305, the UE 115 may communicate on a radio frequency spectrum band of a first RAT using a set of antennas, the set of antennas based on a rank mode associated with the communications as described above with reference to FIGS. 2 through 6. In certain examples, the operations of block 1305 may be performed by the first RAT component as described with reference to FIGS. 8 and 9.

At block 1310, the UE 115 may determine, for at least one antenna of the set of antennas, that a demand requirement associated with the communications is below a threshold level as described above with reference to FIGS. 2 through 6. In certain examples, the operations of block 1310 may be performed by the demand requirement component as described with reference to FIGS. 8 and 9.

At block 1315, the UE 115 may reconfigure, based on the demand requirement, the at least one antenna of the set of antennas to perform communications on the radio frequency spectrum band of a second RAT as described above with reference to FIGS. 2 through 6. In certain examples, the operations of block 1315 may be performed by the antenna reconfiguring component as described with reference to FIGS. 8 and 9.

Although an antenna or antennas are described as examples in the present disclosure, the techniques and the methods described herein apply to various other resources associated with at least one device (e.g., a UE 115, an AP 106, or a base station 105, among others). Additional resources may include, but are not limited to, modem hardware (e.g., a processing unit of a modem), baseband hardware, a radio frequency (RF) front end, an RF back end, RF chip components (e.g., a number of oscillators), other resources, or a combination thereof. As such, the described techniques and methods also apply to other resources associated with at least one device, and examples and embodiments based on these other resources are contemplated.

Figure 14:
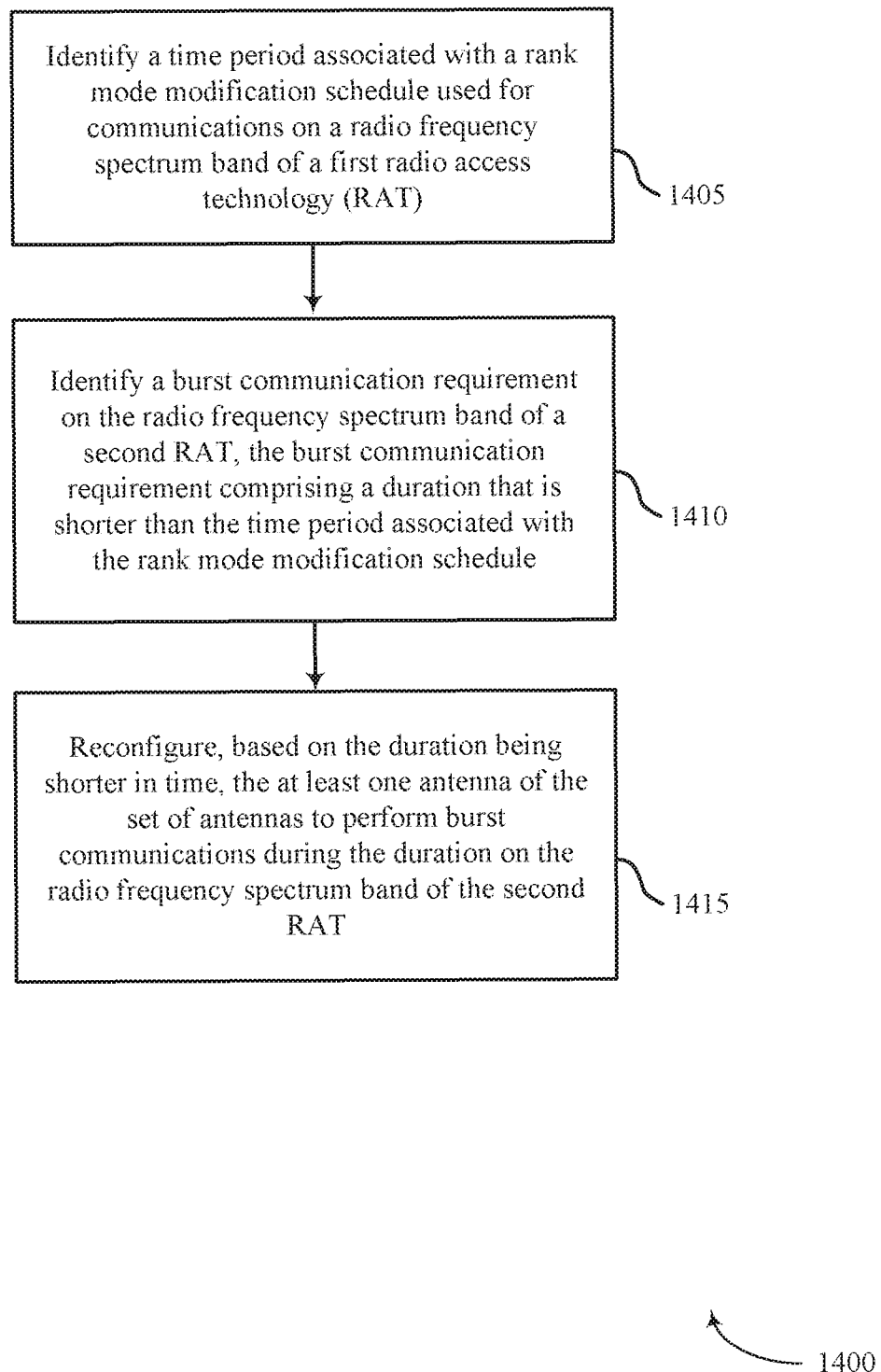

FIG. 14 shows a flowchart illustrating a method 1400 for radio frequency spectrum band harmonization in accordance with various aspects of the present disclosure. The operations of method 1400 may be implemented by a device such as a UE 115 or its components as described with reference to FIGS. 1 through 6. For example, the operations of method 1400 may be performed by the frequency harmonization manager as described herein. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may identify a time period associated with a rank mode modification schedule used for communications on a radio frequency spectrum band of a first RAT as described above with reference to FIGS. 2 through 6. In certain examples, the operations of block 1405 may be performed by the rank mode component as described with reference to FIGS. 8 and 9.

At block 1410, the UE 115 may identify a burst communication requirement on the radio frequency spectrum band of a second RAT, the burst communication requirement including a duration that is shorter than the time period associated with the rank mode modification schedule as described above with reference to FIGS. 2 through 6. In certain examples, the operations of block 1410 may be performed by the burst communication requirement component as described with reference to FIGS. 8 and 9.

At block 1415, the UE 115 may reconfigure, based on the duration being shorter in time, the at least one antenna of the set of antennas to perform burst communications during the duration on the radio frequency spectrum band of the second RAT as described above with reference to FIGS. 2 through 6. In certain examples, the operations of block 1415 may be performed by the antenna reconfiguring component as described with reference to FIGS. 8 and 9.

Although an antenna or antennas are described as examples in the present disclosure, the techniques and the methods described herein apply to various other resources associated with at least one device (e.g., a UE 115, an AP 106, or a base station 105, among others). Additional resources may include, but are not limited to, modem hardware (e.g., a processing unit of a modem), baseband hardware, a radio frequency (RF) front end, an RF back end, RF chip components (e.g., a number of oscillators), other resources, or a combination thereof. As such, the described techniques and methods also apply to other resources associated with at least one device, and examples and embodiments based on these other resources are contemplated.

Figure 15:
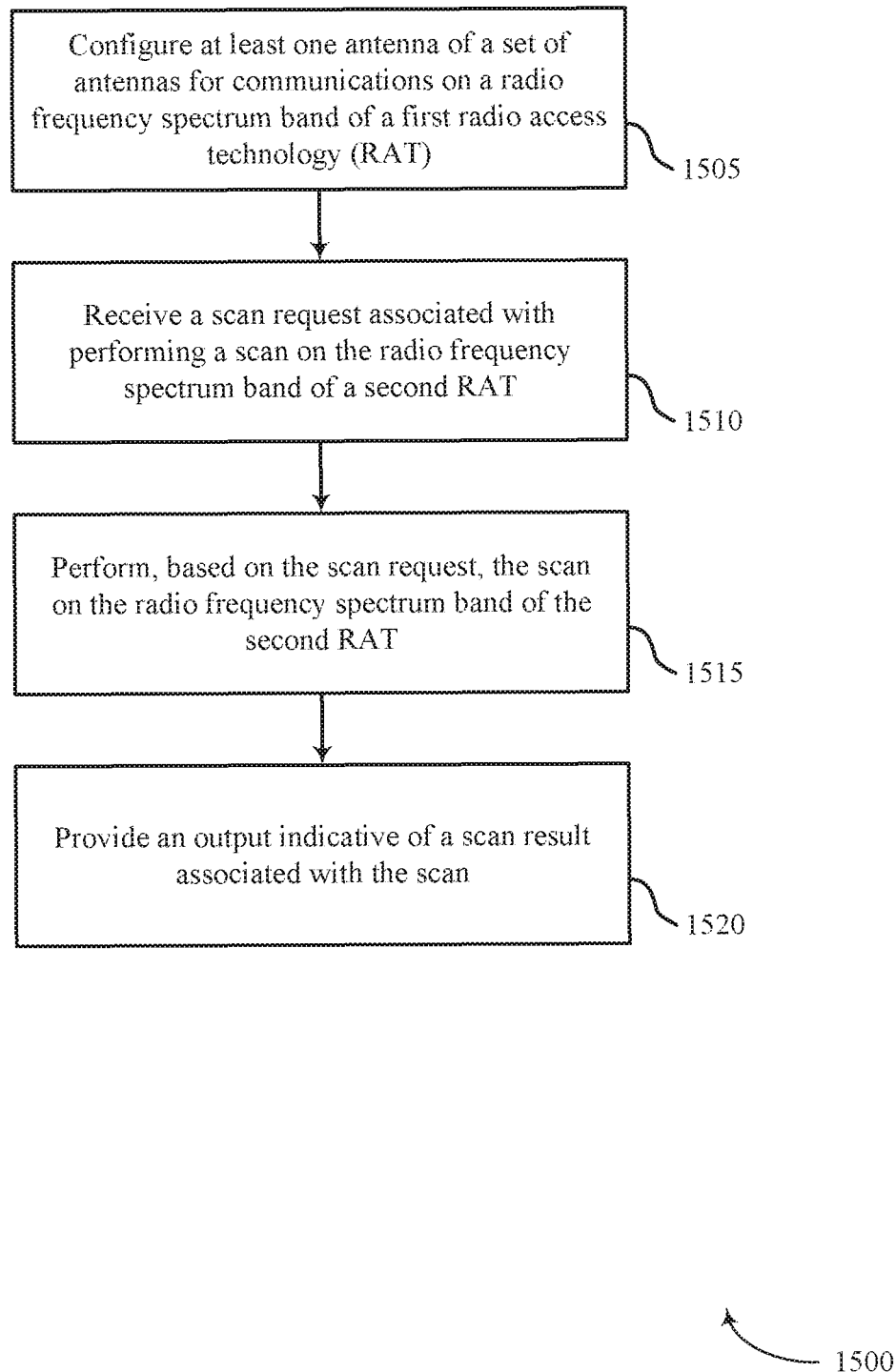

FIG. 15 shows a flowchart illustrating a method 1500 for radio frequency spectrum band harmonization in accordance with various aspects of the present disclosure. The operations of method 1500 may be implemented by a device such as a UE 115 or its components as described with reference to FIGS. 1 through 6. For example, the operations of method 1500 may be performed by the frequency harmonization manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may configure at least one antenna of a set of antennas for communications on a radio frequency spectrum band of a first RAT as described above with reference to FIGS. 2 through 6. In certain examples, the operations of block 1505 may be performed by the antenna configuring component as described with reference to FIGS. 8 and 9.

At block 1510, the UE 115 may receive a scan request associated with performing a scan on the radio frequency spectrum band of a second RAT as described above with reference to FIGS. 2 through 6. In certain examples, the operations of block 1510 may be performed by the scan request component as described with reference to FIGS. 8 and 9.

At block 1515, the UE 115 may perform, based on the scan request, the scan on the radio frequency spectrum band of the second RAT as described above with reference to FIGS. 2 through 6. In certain examples, the operations of block 1515 may be performed by the scanning component as described with reference to FIGS. 8 and 9.

At block 1520, the UE 115 may provide an output indicative of a scan result associated with the scan as described above with reference to FIGS. 2 through 6. In certain examples, the operations of block 1520 may be performed by the scanning component as described with reference to FIGS. 8 and 9.

Although an antenna or antennas are described as examples in the present disclosure, the techniques and the methods described herein apply to various other resources associated with at least one device (e.g., a UE 115, an AP 106, or a base station 105, among others). Additional resources may include, but are not limited to, modem hardware (e.g., a processing unit of a modem), baseband hardware, a radio frequency (RF) front end, an RF back end, RF chip components (e.g., a number of oscillators), other resources, or a combination thereof. As such, the described techniques and methods also apply to other resources associated with at least one device, and examples and embodiments based on these other resources are contemplated.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for radio frequency spectrum band harmonization.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as at least one instruction or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-$a$, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 of FIG. 1 may include at least one carrier, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for radio frequency spectrum band harmonization. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, at least one microprocessor in conjunction with a DSP core, or any other such configuration). Thus, the functions described herein may be performed by at least one other processing unit (or core), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by at least one general or application-specific processor.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
communicating on a radio frequency spectrum band of a first radio access technology (RAT) using a set of antennas;
reconfiguring at least one antenna of the set of antennas to perform a first scan on the radio frequency spectrum band of a second RAT;
determining, based at least in part on the first scan, that an access point count value is less than a channel condition metric;
determining, based at least in part on the first scan, whether to reconfigure a remaining portion of antennas of the set of antennas to perform a second scan on the radio frequency spectrum band of the second RAT; and
refraining from reconfiguring the remaining portion of antennas of the set of antennas to perform the second scan.

2. The method of claim 1, further comprising:
determining, based at least in part on the first scan, that the access point count value is greater than a threshold level, wherein refraining from reconfiguring the remaining portion of antennas of the set of antennas to perform the second scan is further based at least in part on the access point count value being greater than the threshold level.

3. The method of claim 1, further comprising:
determining, based at least in part on the first scan, that at least one access point of a set of access points is detected during the first scan, wherein refraining from reconfiguring the remaining portion of antennas of the set of antennas to perform the second scan is further based at least in part on the detection of the at least one access point.

4. The method of claim 1, further comprising:
determining that a channel scan distribution value for a plurality of radio frequency spectrum bands is within a predefined deviation value, wherein reconfiguring the at least one antenna of the set of antennas to perform the first scan on the radio frequency spectrum band of the second RAT is based at least in part on the channel scan distribution value.

5. The method of claim 1, further comprising:
determining that the first scan is associated with a priority scan; and
reconfiguring the remaining portion of antennas of the set of antennas to perform the priority scan.

6. The method of claim 1, further comprising:
determining that a congestion metric associated with a different radio frequency spectrum band is above a threshold level; and
refraining from reconfiguring the at least one antenna of the set of antennas to perform the first scan.

7. The method of claim 1, further comprising:
identifying a priority metric for the communications during a time period on the radio frequency spectrum band of the first RAT.

8. The method of claim 7, further comprising:
reconfiguring, based at least in part on the priority metric, the at least one antenna, the remaining portion of antennas, or combinations thereof, of the set of antennas to perform the first scan during the time period.

9. A method of wireless communication comprising:
identifying a priority metric for communications during a time period on a radio frequency spectrum band of a first radio access technology (RAT);
reconfiguring, based at least in part on the priority metric, at least one antenna of a set of antennas to perform a scan on the radio frequency spectrum band of a second RAT; and
performing the scan during the time period on the radio frequency spectrum band of the second RAT.

10. The method of claim 9, wherein performing the scan on the radio frequency spectrum band of the second RAT comprises interfering with the communications during the time period on the first RAT.

11. The method of claim 10, wherein the scan comprises a dual antenna tune-away procedure.

12. The method of claim 9, wherein the priority metric indicates that the communications during the time period comprise at least one blank subframe.

13. The method of claim 12, further comprising:
performing the scan during the at least one blank subframe on the radio frequency spectrum band of the second RAT to avoid interfering with the communications during the time period of the communications on the radio frequency spectrum band of the first RAT.

14. A method of wireless communication comprising:
communicating on a radio frequency spectrum band of a first radio access technology (RAT) using a set of antennas, the set of antennas based at least in part on a rank mode associated with the communications;
determining, for at least one antenna of the set of antennas, that a demand requirement associated with the communications is below a threshold level; and
reconfiguring, based at least in part on the demand requirement, the at least one antenna of the set of antennas to perform communications on the radio frequency spectrum band of a second RAT.

15. The method of claim 14, wherein the demand requirement indicates that the communications are associated with a throughput requirement below a threshold level.

16. The method of claim 14, wherein the demand requirement indicates that the communications are associated with a channel condition parameter above a threshold value.

17. The method of claim 14, wherein the demand requirement indicates that the communications are associated with a predefined modulation and coding scheme.

18. The method of claim 14, further comprising:
transmitting a message to an access point comprising an indication that the at least one antenna of the set of antennas has been reconfigured.

19. The method of claim 18, wherein the message comprises a multiple-input/multiple-output (MIMO) power save (PS) action frame.

20. The method of claim 14, further comprising:
identifying a priority metric for communications during a time period on the radio frequency spectrum band of the first RAT; and
reconfiguring the at least one antenna of the set of antennas to perform communications on the radio frequency spectrum band of the second RAT.

21. The method of claim 14, further comprising:
configuring at least one antenna of the set of antennas for communications on the radio frequency spectrum band of the first radio access technology (RAT); and
receiving a scan request associated with performing a scan on the radio frequency spectrum band of a second RAT.

22. The method of claim 21, further comprising:
performing, based at least in part on the scan request, the scan on the radio frequency spectrum band of the second RAT.

23. The method of claim 22, further comprising:
providing an output indicative of a scan result associated with the scan.

24. The method of claim 23, further comprising:
decoding at least a portion of a message received during the scan; and
determining, based at least in part on the decoded portion of the message, whether to include information associated with the message in the scan result.

25. The method of claim 21, further comprising:
identifying a reduced communication requirement for a time period associated with the communications on the radio frequency spectrum band of the first RAT; and
scheduling the scan to be performed during the time period.

26. The method of claim 25, wherein the time period comprises at least a portion of a transmit time interval.

27. A method of wireless communication comprising:
identifying a time period associated with a rank mode modification schedule used for communications on a radio frequency spectrum band of a first radio access technology (RAT);
identifying a burst communication requirement on the radio frequency spectrum band of a second RAT, the burst communication requirement comprising a duration that is shorter than the time period associated with the rank mode modification schedule; and
reconfiguring, based at least in part on the duration being shorter in time, at least one antenna of a set of antennas to perform burst communications during the duration on the radio frequency spectrum band of the second RAT.

28. The method of claim 27, wherein the burst communications comprise a channel measurement procedure on the radio frequency spectrum band of the second RAT.

29. The method of claim 27, further comprising:
refraining from transmitting a message to a base station indicating that the at least one antenna of the set of antennas has been reconfigured.

* * * * *